United States Patent
Schubert et al.

(10) Patent No.: US 10,140,049 B2
(45) Date of Patent: Nov. 27, 2018

(54) PARTITIONING SYSTEMS OPERATING IN MULTIPLE DOMAINS

(71) Applicant: MISSING LINK ELECTRONICS, INC., San Jose, CA (US)

(72) Inventors: Nils Endric Schubert, San Jose, CA (US); Felix Eckstein, Hamburg (DE)

(73) Assignee: Missing Link Electronics, Inc., San Jose, CA (US)

( * ) Notice: Subject to any disclaimer, the term of this patent is extended or adjusted under 35 U.S.C. 154(b) by 659 days.

(21) Appl. No.: 14/373,023

(22) PCT Filed: Feb. 23, 2013

(86) PCT No.: PCT/US2013/027528
§ 371 (c)(1),
(2) Date: Jul. 17, 2014

(87) PCT Pub. No.: WO2013/126852
PCT Pub. Date: Aug. 29, 2013

(65) Prior Publication Data
US 2014/0380001 A1 Dec. 25, 2014

Related U.S. Application Data

(60) Provisional application No. 61/603,200, filed on Feb. 24, 2012.

(51) Int. Cl.
*G06F 3/06* (2006.01)
*G06F 9/50* (2006.01)
(Continued)

(52) U.S. Cl.
CPC ............ *G06F 3/0644* (2013.01); *G06F 3/061* (2013.01); *G06F 3/0673* (2013.01);
(Continued)

(58) Field of Classification Search
CPC ............. G06F 2003/0692; G06F 21/53; G06F 21/554; G06F 3/061; G06F 3/0644;
(Continued)

(56) References Cited

U.S. PATENT DOCUMENTS 8,407,699 B2 * 3/2013 Larkin .................... G06F 9/468
718/1
8,418,175 B2 * 4/2013 Mansell ................ G06F 12/145
718/1

(Continued)

*Primary Examiner* — Robert E Fennema
*Assistant Examiner* — Shon G Foley
(74) *Attorney, Agent, or Firm* — Douglas L. Weller

(57) ABSTRACT

Within a partitioned system, a first system partition operates in a safety domain in which predictable operation of the first system partition is necessary to protect the system or operators of the system from harm. A second system partition operates in a user domain in which information supplied by the second system partition is not sufficiently reliable to be used by the first system partition within the safety domain. A mediator controller is connected between the first system partition and the second system partition. The mediator controller receives the information supplied by the first system partition. The mediator controller monitors and supervises use of the information by the second system partition in order maintain requirements of the safety domain to protect the system or operators of the system from harm.

20 Claims, 17 Drawing Sheets

(51) Int. Cl.
*G06F 21/53* (2013.01)
*G06F 21/55* (2013.01)
*H04L 29/08* (2006.01)
*H04L 29/06* (2006.01)

(52) U.S. Cl.
CPC ............ *G06F 9/5077* (2013.01); *G06F 21/53* (2013.01); *G06F 21/554* (2013.01); *H04L 63/02* (2013.01); *H04L 67/12* (2013.01); *G06F 2003/0692* (2013.01); *Y02D 10/22* (2018.01); *Y02D 10/36* (2018.01)

(58) Field of Classification Search
CPC .. G06F 3/0673; G06F 9/5077; G06F 17/5072; H04L 63/02; H04L 63/00; H04L 67/12; Y02B 60/142; Y02B 60/167; Y02D 10/36; Y02D 10/22
USPC .......................................................... 713/153
See application file for complete search history.

(56) References Cited

U.S. PATENT DOCUMENTS

| | | | |
|---|---|---|---|
| 8,583,913 B1* | 11/2013 | Gabrielson | H04L 43/10 455/403 |
| 2003/0147534 A1* | 8/2003 | Ablay | H04L 9/3271 380/270 |
| 2005/0049724 A1* | 3/2005 | Chandhoke | G05B 19/4147 700/18 |
| 2006/0067209 A1* | 3/2006 | Sheehan | H04L 29/08846 370/216 |
| 2009/0328066 A1* | 12/2009 | Michail | G06F 9/44526 719/316 |
| 2012/0158240 A1* | 6/2012 | Downs, Jr. | H04L 67/12 701/30.1 |
| 2012/0286269 A1* | 11/2012 | Hemon | G01R 31/31717 257/48 |
| 2013/0305066 A1* | 11/2013 | Mullins | G06F 1/266 713/310 |

* cited by examiner

PARTITIONING SYSTEMS OPERATING IN MULTIPLE DOMAINS

FIELD OF THE INVENTION

The present invention relates to partitioned systems in general and, more particularly, to the partitioning of systems that operate in both a safety domain and a user domain.

BACKGROUND OF THE INVENTION

An Embedded System can be seen as an electronic processing system functionally integrated with another system. The latter, which can be called the Target System, typically is a mechanical system (or has at least some mechanical components or aspects), such as, for example a washing machine, a printing machine, a vehicle, an aeroplane, a manufacturing robot, or a medical diagnostic system. Therefore, the one (or more) Embedded Systems themselves become a component of said Target System, an aspect which is explained in Wolf, W. H. (2001); Computers as Components: Principles of Embedded Computing System Design; Morgan Kaufman; which is hereby included by reference. The design of Embedded Systems itself (which is hardware, software, firmware, a computer architecture, real-time, etc) is well researched and documented, for example in Marwedel, P. (2010); Embedded and cyber-physical systems in a nutshell; DAC.COM Knowledge Center Article; which is hereby included by reference. This includes even more current aspects given by the possibilities of connecting things to the Internet, which is, for example, described in "Cyber-Physical Systems" Lee, E. A. (2008); Cyber Physical Systems: Design Challenges; International Symposium on Object/Component/Service-Oriented Real-Time—ISORC 2008, which is hereby included by reference.

However, the field of how to integrate and how to interface between the Embedded System and the Target System still has many questions left open.

One of those open questions is how to deal with the different life-cycles of the one (or more) Embedded Systems and the Target System: Embedded Systems such as almost all electronics are driven by Moore's Law: In semiconductor technology, every 18 months, or so, semiconductor innovation brings a so-called node size shrink which allows to double the number of transistors on a chip, effectively doubling the functionality of what can be integrated on a semiconductor device. This innovation has made compact, functionality-rich, battery-operated devices such as smart phones, for example, possible. However, Moore's Law can also be seen as an economic law where the cost of a semiconductor device somewhat halves over 18 months. In our daily lives we are experiencing this when our personal computer (PC), or our mobile phone gets cheaper, every day.

This has some challenging implications: Most electronics have a short half-life and quickly become obsolete. So, unlike in some other industries (machining, automotive, aerospace, etc) things change at a rapid pace. This is an exponential effect, not just an over-linear one, which most humans have a hard time to deal with and it means that if a chip is too expensive for a certain application today, a successor chip most likely can enter such cost-driven markets next year.

On the other side, semiconductor industry is known to have a huge up-front engineering cost (so-called non-recurrent engineering—NRE): Today, to develop an integrated circuit device costs more than $50M. Semiconductor manufacturing (done in so-called "fabs") requires a huge capital investment of multiple billion $s which depreciates over a short time, typically some years as the industry moves to bigger wafers and smaller transistor sizes. As a result, semiconductor industry highly favors customers who order now and in huge quantities of the same.

PCs digest a lot of semiconductor parts and ship around in 100M units per year. Mobile phones also need a lot of semiconductor parts, and ship in 1 B units per year. And then, there is an even bigger market which is estimated to be at 10 B units per year: The embedded and the consumer electronics market. Embedded means that a computer—as complex as it may be—is merely a component to an overall system; an important one for the functionality and/or value add but just one component. This embedded market is highly fragmented, and every application requires something totally different, plus it may have a short life-cycle. So, more and more systems need semiconductor parts in smaller and smaller individual quantities.

This mismatch becomes very obvious where an everyday consumer can see it: In automotive multimedia or PND where a brand-new car comes with already obsolete, or at least significantly aged electronics. This invention addresses these problems of Embedded Systems. Security is information security as applied to computers, embedded systems and networks, and means the collective processes and mechanisms by which sensitive and valuable information and services are protected from publication, tampering or collapse by unauthorized activities or untrustworthy individuals and unplanned events respectively.

Safety is the state of being safe, of being protected against consequences of failure, damage, error, accidents, harm. Functional Safety is freedom from unacceptable risk of physical injury or of damage to the health of people either directly or indirectly (through damage to property or to the environment). SIL is Safety Integrity Level and is defined as a relative level of risk-reduction provided by a safety function, or to specify a target level of risk reduction. In simple terms, SIL is a measurement of performance required for a safety instrumented function according to the European Functional Safety standards based on the IEC 61508 standard, as it is defined in David, S. and Kennath, S; (2004); Functional Safety, A Straightforward Guide to Applying IEC 61508 and Related Standards; Elsevier Butterworth-Heinemann, which is hereby included by reference, or in Alessandro, B. (2007); Reliability Engineering—Theory and Practice; Springer Verlag, which is hereby included by reference. ASIL is Automotive Safety Integrity Level, as it is defined in DIN/ISO 26262, which is hereby included by reference.

An Embedded System is a computer system designed for specific control functions within a larger system, typically with real-time computing constraints. It is embedded as part of a complete device often including hardware and mechanical parts, as it is defined in Marwedel, P. (2010); Embedded and cyber-physical systems in a nutshell; DAC.COM Knowledge Center Article, which is hereby included by reference.

PCB is a Printed Circuit Board.

ECU is an Electronic Control Unit and is a generic term for any embedded system that controls one or more of the electrical systems or subsystems in a motor vehicle.

PLC is a Programmable Logic Controller and is a digital computer used for automation of electromechanical processes, such as control of machinery on factory assembly lines, amusement rides, or light fixtures.

IVI is In-Vehicle Infotainment and is an electronic product which combines multi-media, audio/video and personal navigation system integrated within a motor vehicle.

PND is a Personal Navigation Device which is a portable electronic product which combines a positioning capability (such as GPS) and navigation functions.

IFE is In-Flight Entertainment and is an electronic product which combines multi-media and audio/video and personal entertainment and is typically integrated in airplanes.

IFEC is In-Flight Entertainment and Connectivity and is another term for IFE which also indicates Internet connectivity.

MMI is Man-Machine Interface, sometimes also known as User Interface for interaction between a (computing) machine and a human. The goal of interaction between a human and a machine at the user interface is effective operation and control of the machine, and feedback from the machine which aids an operator in making operational decisions.

HMI is Human-Machine Interface, also known as MMI.

A Programmable Circuit is an integrated digital and/or analog circuit device which can be user-programmed without a manufacturing step, typically by uploading a configuration bit file into the device after power-up.

FPGA is a Field-Programmable Gate-Array, a special digital Programmable Circuit device.

FPAA is a Field-Programmable Analog-Array, a special analog Programmable Circuit device.

PLD is a Programmable Logic Device, another special Programmable Circuit device.

CPLD is a Complex Programmable Logic Device, another special Programmable Circuit device.

FSM is a Finite State Machine which can be implemented in a digital circuit.

CPU is a Central Processing Unit, typically a Von-Neumann data processing machine.

DSP is a Digital Signal Processor, a CPU highly optimized towards processing digital signal values.

ASIC is an Application Specific Integrated Circuit which is a digital, or mixed-signal, or analog integrated circuit optimized and built for a specific application.

ASSP is an Application-Specific Standard Processor which is an integrated digital circuit device which comprises one, or more, CPUs, plus application-specific circuitry.

Microcontroller is a digital and/or mixed-signal integrated circuit device which comprises one, or more, CPUs plus special-purpose peripherals and inputs/outputs.

SOC is a System-on-a-Chip which is a digital and/or mixed-signal integrated circuit device which comprises one, or more, CPUs, special-purpose peripherals, inputs/outputs, application-specific circuitry, memory, etc.

PSOC is a Programmable System-on-a-Chip, a SOC which is implemented using Programmable Circuits.

HW is Hardware, typically integrated circuits, and passive electronic components, combined on a PCB.

SW is Software, typically human and/or machine-readable code for execution by a data processing machine.

FW is Firmware, typically Hardware-dependent Software code.

HDL is Hardware Description Language which is a human and machine readable language typically used to describe the behavior, structure, concurrency, and/or timing of integrated digital, or analog, circuitry. Examples of HDL are VHDL, Verilog, SystemVerilog, SystemC, or C, or C++.

VHDL is VHSIC hardware description language which is the HDL specified and standardized, for example, by IEEE 1076-2008, which is hereby included by reference.

Verilog is the HDL specified and standardized for example, by IEEE 1364-2005, which is hereby included by reference.

SystemVerilog is the HDL specified and standardized, for example, by IEEE 1800-2009, which is hereby included by reference.

SystemC is the HDL specified and standardized, for example, by IEEE 1666-2005, which is hereby included by reference.

PLB is Processor Local Bus which is defined by IBM's CoreConnect on-chip architecture.

AXI is the Advanced eXtensible Interface which is part of the Advanced Microcontroller Bus Architecture (AMBA) defined by ARM Ltd.

MCU is a Memory Controller Unit. An MCU can, sometimes, also include a Memory Management Unit (MMU) which handles physical and virtual memory addressing.

RAM is Random Access Memory which typically is volatile digital storage, such as DDR2 RAM or DDR3 RAM or LPDDR RAM.

OS is Operating System which is Software code for resource, task, and user management of a data processing system.

Android is a Linux-based operating system for mobile devices such as smart-phones and tablet computers which is developed by the Open Handset Alliance led by Google.

Proxy is a Proxy Server which is a computer system or an application that acts as an intermediary for requests from clients seeking resources from other computer systems or applications.

Router is a device or an application that forwards data packets between computer networks, creating an overlay inter-network.

A Bridge applies a forwarding technique used in packet-switched computer networks and typically makes no assumptions about where in a network a particular address is located.

Filter is a data processing system which controls which content is permitted to a client.

Gateway is a networking node typically equipped for interfacing with another network that uses different protocols.

Firewall is a device or set of devices designed to permit or deny network transmissions based upon a set of rules and is frequently used to protect networks from unauthorized access while permitting legitimate communications to pass.

A Tunnel is using a networking protocol where one network protocol (the delivery protocol) encapsulates a different payload protocol, for example to carry a payload over an incompatible delivery-network, or to provide a secure path through an untrusted network.

GSM stands for Global System for Mobile Communications and is a standard set developed by the European Telecommunications Standards Institute to describe technologies for second generation digital cellular networks.

UMTS stands for Universal Mobile Telecommunications System and is a third generation mobile cellular technology for networks based on the GSM standard.

LTE stands for Long-Term Evolution and is a fourth generation mobile cellular technology for networks based on the GSM standard.

GPS is Global Positioning System which is a space-based satellite navigation system that provides location and time information in all weather, anywhere on or near the Earth.

CAN is Controller Area Network which is a vehicle bus standard ISO 11898 designed to allow microcontrollers and devices to communicate with each other within a vehicle without a host computer.

MOST is Media Oriented Systems Transport which is a high-speed multimedia network technology optimized by the automotive industry.

Flexray is an automotive network communications protocol developed by the FlexRay Consortium, and which is currently being converted into an ISO standard.

LIN is Local Interconnect Network which is a vehicle bus standard or computer networking bus-system used within current automotive network architectures.

AFDX is Avionics Full-Duplex Switched Ethernet which is a data network for safety-critical applications that utilizes dedicated bandwidth while providing deterministic Quality of Service. AFDX is based on IEEE 802.3 Ethernet technology and is described specifically by the ARINC 664 specification.

SPI is Serial Peripheral Interface Bus which is a synchronous serial data link standard, named by Motorola, that operates in full duplex mode.

IIC is Inter-Integrated Circuit which is a multi-master serial single-ended computer bus invented by Philips that typically is used to attach low-speed peripherals.

GPIO is General Purpose Input/Output is generic pins on an integrated circuit whose behavior (including whether it is an input or output pin) can be controlled through software.

Ethernet is a family of computer networking technologies for local area networks and is standardized in IEEE 802.3.

EtherCat is Ethernet for Control Automation Technology which is an open high performance Ethernet-based field-bus system.

ProfiNET is the open industrial Ethernet standard of PROFIBUS & PROFINET International for automation.

Sercos is Serial Real-Time Communication System Interface which is a globally standardized open digital interface for the communication between industrial controls, motion devices (drives) and input output devices (I/O) and is classified as standard IEC 61491 and EN 61491.

TTCAN is Time-Triggered communication on CAN which is defined by the ISO 11898-4 standard. CANOpen is a communication protocol and device profile specification for embedded systems used in automation. The basic CANopen device and communication profiles are given in the CiA 301 specification released by CAN in Automation.

IO-Link is the industrial communication standard IEC 61131-9 to connect smart sensors and actuators.

UDP is User Datagram Protocol which is one of the core members of the Internet Protocol Suite, the set of network protocols used for the Internet.

TCP/IP is Transmission Control Protocol/Internet Protocol is a descriptive framework for the Internet Protocol Suite of computer network protocols created in the 1970s by DARPA. TCP/IP has four abstraction layers and is defined in RFC 1122.

IPSec is Internet Protocol Security which is a protocol suite for securing Internet Protocol (IP) communications by authenticating and encrypting each IP packet of a communication session. IPSec also includes protocols for establishing mutual authentication between agents at the beginning of the session and negotiation of cryptographic keys to be used during the session.

RS232 is Recommended Standard 232 which is the traditional name for a series of standards for serial binary single-ended data and control signals connecting between a DTE (Data Terminal Equipment) and a DCE (Data Circuit-terminating Equipment).

RS485 also known as EIA-485, also known as TIA/EIA-485 is a standard defining the electrical characteristics of drivers and receivers for use in balanced digital multi-point systems. This standard is published by the ANSI Telecommunications Industry Association/Electronic Industries Alliance (TINEIA).

USB is Universal Serial Bus which is an industry standard developed in the mid-1990s that defines the cables, connectors and communications protocols used in a bus for connection, communication and power supply between computers and electronic devices.

PATA is Parallel ATA which is an interface standard for the connection of storage devices such as hard disks, solid-state drives, floppy drives, and optical disc drives in computers.

SATA is Serial Advanced Technology Attachment which is a computer bus interface for connecting host bus adapters to mass storage devices such as hard disk drives and optical drives.

PCIe also known as PCI Express (Peripheral Component Interconnect Express) is a computer expansion bus standard maintained and developed by the PCI Special Interest Group.

WiFi is a mechanism that allows electronic devices to exchange data wirelessly over a computer network using the IEEE 802.11 family of standards.

Bluetooth is a proprietary open wireless technology standard for exchanging data over short distances, creating personal area networks with high levels of security, a standard which is maintained by the Bluetooth Special Interest Group.

DESCRIPTION OF RELATED ART

Various approaches for interfacing non-safety components of an Embedded System to a safety system are known in the art. As we will demonstrate, however, none of these techniques teach how to decouple the life-cycle of at least one portion of the Embedded System in the Safety Domain from the life-cycle of the Target System.

OLE for Process Control (OPC) is one of those examples. OLE stands for Object Linking and Embedding and is a SW technology from Microsoft. OPC is, for example, described in Lange, J., Iwanitz, F., and Burke, T. J. (2010); OPC—From Data Access to Unified Architecture; VDE VERLAG GMBH, which is hereby included by reference. OPC was designed to provide a common bridge for Microsoft Windows based software applications and process control hardware where standards define consistent methods of accessing field data from plant floor devices. The basic concept of OPC is shown in FIG. 3 where an OPC client 3001 can observe and/or control one, or more, device of a Control System 3003 in the Safety Domain 3010 via an OPC server 3002. As it is obvious, OPC is a standard to interface between Embedded Systems, for example ES 1002 of FIG. 1A, and certain MMI, for example MMI 1009 of FIG. 1A, FIG. 1B and FIG. 1C. As such it cannot be used to migrate certain functionality out of the Embedded System, for example ES 1002, into separate devices, such as MMI, for example, which are outside of the safety domain, for example Safety Domain 1010 of FIG. 1D. Neither does OPC enable to bring in any upgraded and/or replacement Embedded System into the Safety Domain without having to go through extensive safety re-certification processes and procedures. In short, OPC cannot serve as a means for de-coupling the life-cycle of the Embedded System from the life-cycle of the Target System. Besides, OPC is a fixed SW interface and as such cannot provide (nor does it teach how to possibly provide) the necessary flexibility for changing the interfaces, at electrical level, for example.

Another example is MirrorLink. MirrorLink goes back to the so-called Terminal Mode and is a standard owned by the Car Connectivity Consortium, a non-profit legal entity registered in Delaware, USA.

MirrorLink is, for example, described in Car Connectivity Consortium (2012) on Jan. 6, 2012, which is hereby included by reference. FIG. 2 outlines the concept of MirrorLink, and is based on the above mentioned description. MirrorLink provides a standardized interface to connect a mobile phone, for example mobile phone 2003, to an automotive IVI system, for example IVI 2002, and where the mobile phone's MMI is augmented—or, sometimes, even be replaced—by the car's IVI inputs (such as buttons 2004, 2005, 2006) and outputs (such as display 2004 and loudspeakers 2001). As such MirrorLink extends a system in the Safety Domain, for example the car's Safety Domain 2010, and allows to bring in, upgrade, replace mobile phones. However, it fails to provide any means, neither does it teach any means on how to provide such means, for upgrading and/or replacing Embedded System inside the Target System. For example, MirrorLink does not provide any means to upgrade the car's IVI system 2002 from the car's Safety Domain 2010 without having to go through extensive safety certification processes and procedures. Besides, MirrorLink is a fixed, software-only protocol that runs over USB and/or WiFi and as such it does not provide (nor does it teach how to provide) the necessary flexibility on changing the interfaces between the Safety Domain and the User Domain, at electrical level, for example.

DETAILED DESCRIPTION OF PREFERRED EMBODIMENTS

Figure 1A:
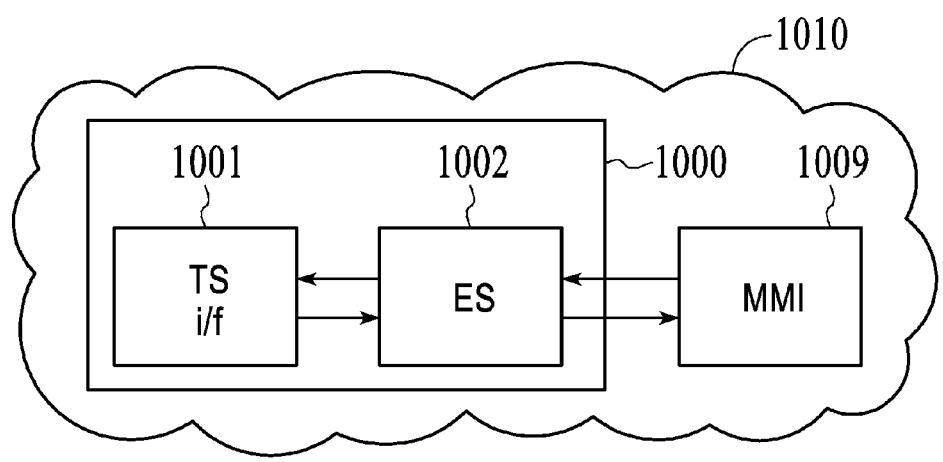
FIG. 1A, FIG. 1B, FIG. 1C and FIG. 1D illustrate the de-coupling the life-cycle of embedded system components.
Figure 1B:
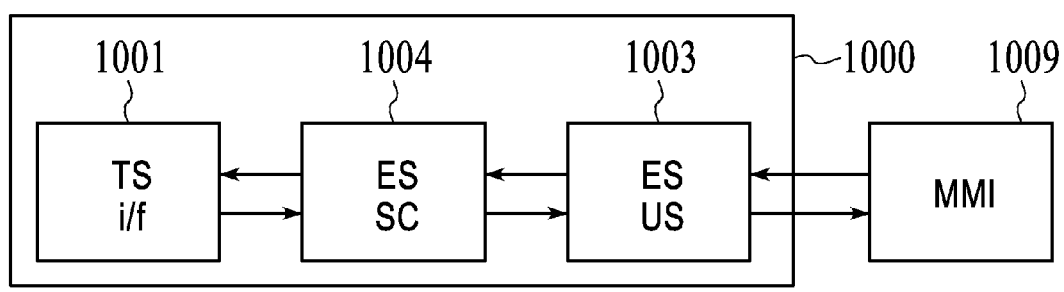
Figure 1C:
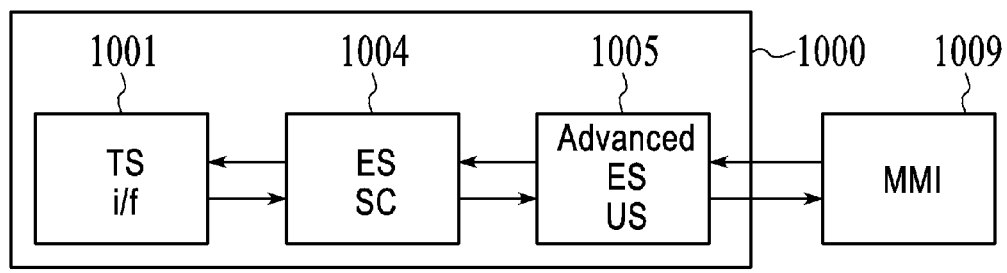
Figure 1D:
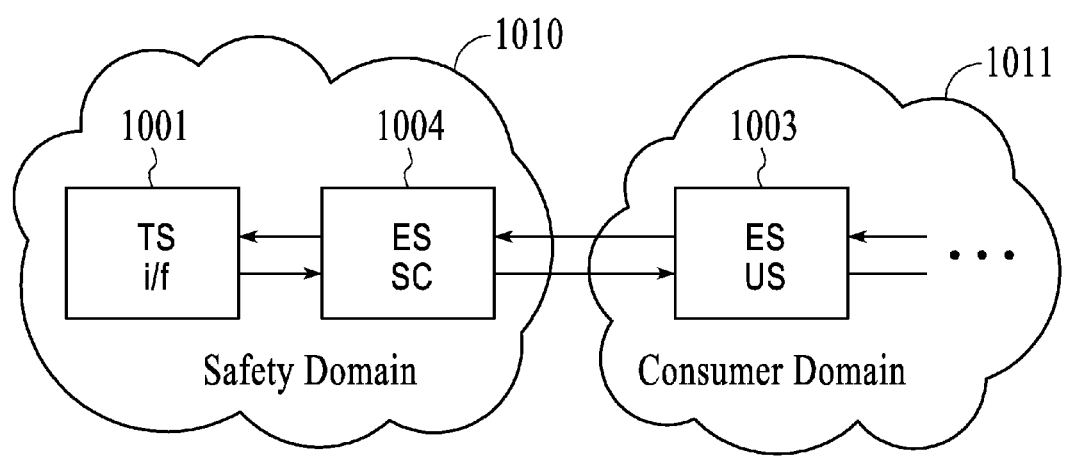
Figure 2:
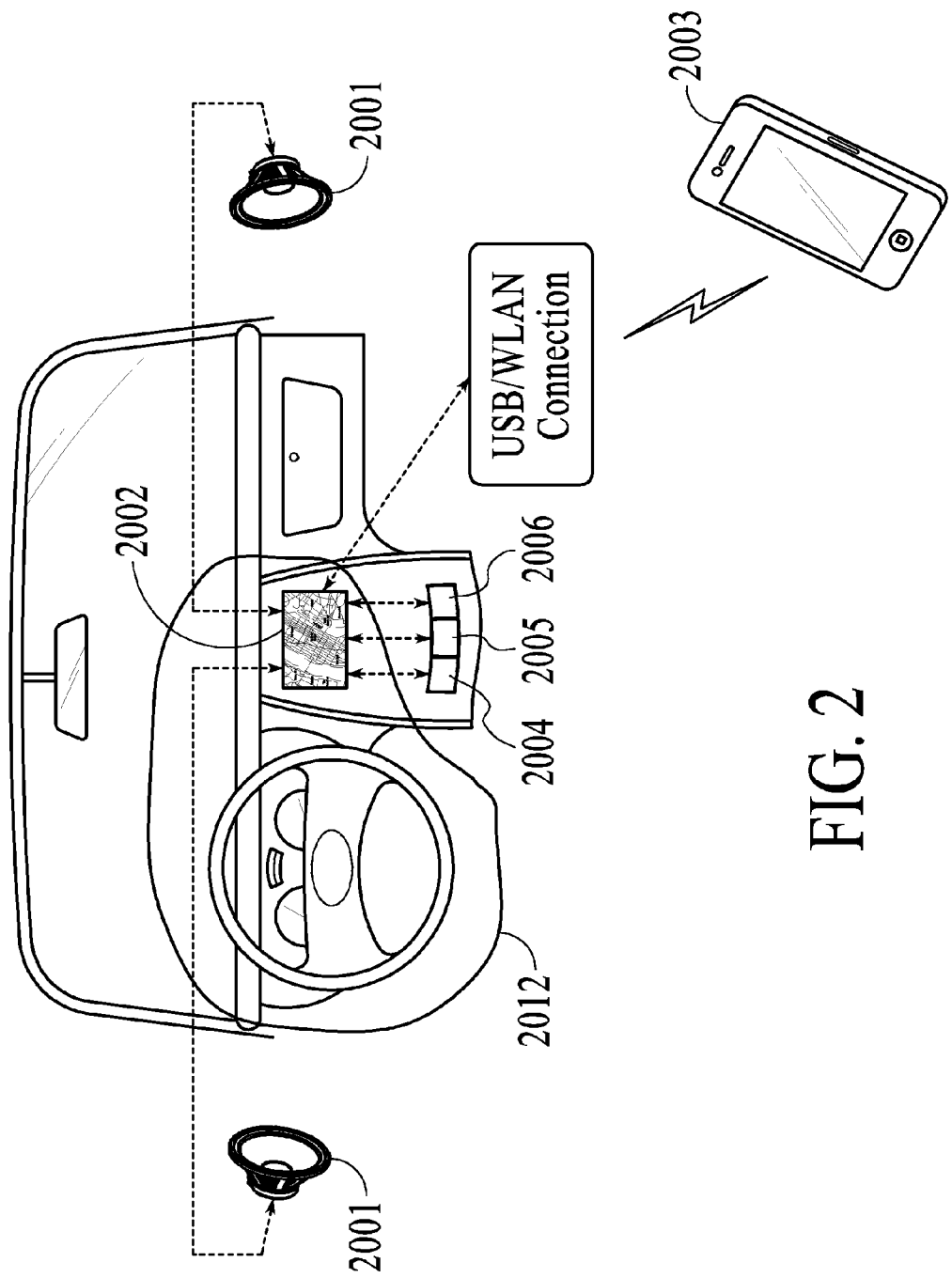
FIG. 2 shows a partitioning in an automotive embedded system.
Figure 3:
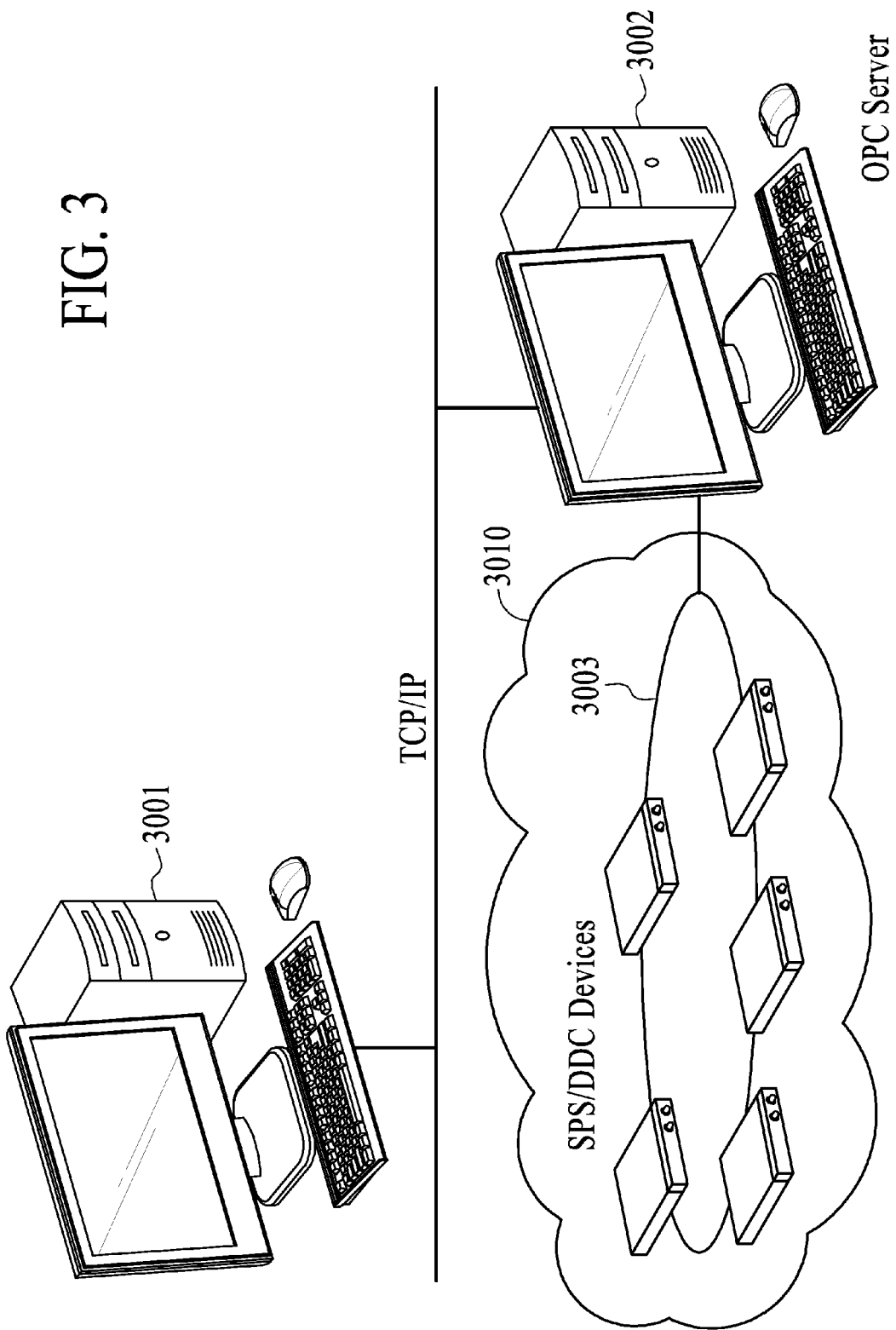
FIG. 3 shows partitioning in an industrial embedded system.

For many Embedded Systems it becomes highly desirable to de-couple the life-cycle, for example the product life-cycle, or the development life-cycle, or the utilization life-cycle, of those electronic components which are exposed to rapid innovation, from the life-cycle of the Target System. Unfortunately, this de-coupling is not trivial because the Embedded System, which is a component, or a system partition (i.e., subsystem) of the Target System cannot be replaced, nor partitioned easily: Either the Embedded System is highly integrated and optimized towards the target application, which may result in the Embedded System being implemented as a single component such as a PCB, or sometimes a SOC, or a SW functional block, which cannot be broken-up into multiple parts. Or, the Embedded System comprises multiple components which communicate with each other; this communication is complex, often has to meet so-called real-time constraints which make it hard to partition. Or, so-called meta functionality is implemented by close interaction between two, or more, Embedded System components, an example of which is automotive ESP (Electronic Stability Program) which typically is implemented by an automotive engine ECU interoperating with the automotive ECU for anti-lock braking. Sometimes some of the Embedded Systems have crucial responsibility for a safe operation of the Target System, and as such must fulfill certain safety requirements. Good examples are the above mentioned anti-lock brake ECUs for cars, or emergency shutdown control in heavy machinery. Safety in Embedded Systems not only comes as an additional requirement and/or design constraint, but also may dictate certain design, development, test, manufacturing processes and procedures to warrant the underlying safety. SIL, the IEC 61508, DIN/ISO 26262, and others, are examples of such processes and procedures well known in the art.

The fact that such rules and processes and procedures, sometimes even laws, cannot simply be tested for at a later stage, but in its entirety must be followed from the inception of the Embedded System to design, development, and production, inhibit the integration of any Embedded System into a Target System which requires safety and integrity, unless the Embedded System has explicitly been designed under safety integrity regulations. This makes replacing today's Embedded Systems, or parts of it, in the Target System economically infeasible.

Now, if in a Target System the one, or more, Embedded Systems cannot be upgraded, or replaced easily and cost-effectively, how can the life-cycle of the Target System be de-coupled from the life-cycle of the one, or more, Embedded Systems?

One option is to partition the Embedded System by design into one part that is associated with the Target System, and therefore resides in a so-called Safety Domain, and into another part that can more easily be replaced, and/or upgraded, and/or changed, to more closely follow semiconductor and electronics innovation. FIG. 1A, FIG. 1B, FIG. 1C and FIG. 1D each show such a system partitioning where a Target System 1000 comprises an Embedded System 1002. That Embedded System ES 1002 is partitioned into one part for the safety critical aspects, part ES SC 1004, and the remainder Embedded System ES US 1003, which may be untrusted, or unsafe, or uncertified. The safety critical part ES SC 1004 interfaces with said untrusted part ES US 1003 and, combined, provides at least the functionality of the original Embedded System ES 1002. The Embedded System part ES SC 1004 also interfaces with the Target System interface TS i/f 1001, designated for initially interfacing with the original Embedded System ES 1002.

This is the spirit of this invention. However, as we will demonstrate such partitioning is not trivial and must overcome quite some challenges. For example, to support a reasonable unrestricted upgrade path and/or replacement path for the ES US 1003, there must be sufficient flexibility inside ES SC 1004 to alter the interfaces to ES US 1003 to accommodate new, or changed, interfaces, new, or changed, connectivity, and new, or changed, communication means required by, or supported by the advanced ES US 1005 (which is a replacement or upgrade for ES US 1003). Obviously, one or more inputs and/or one or more outputs of ES US 1003 may have changed between ES US 1003 and advanced ES US 1005. These changes may be at various levels, according to the ISO/OSI communication layers: For example, at the physical level the voltages and/or the impedances may have changed. Or, at higher ISO/OSI layers the underlying protocol may have changed. Sometimes these communication changes are backward compatible and it may be acceptable if the advanced ES US 1005 falls back to that compatible communication. But that is not possible all the times and therefore it becomes necessary to alter the communication in ES SC 1004.

How to design an Embedded System part ES SC 1004 which can alter the communication from ES US 1003 to advanced ES US 1005 during the life-cycle of ES SC 1004, without fundamentally replacing physical components is not obvious and a non-trivial technical problem. Even, when this alteration, in a more simple matter, only involves changing the SW of ES SC 1004. At the time when ES SC 1004 (or ES 1002) is designed, it simply is technically not feasible to anticipate and plan for all possible interface changes that may happen to ES US 1003. On the other hand by combining techniques known in the art such as virtualization, software-defined radio technology, programmable digital circuits, Delta-Sigma modulation, and utilizing novel HW/SW co-design techniques an ES SC 1004 part can be designed that has substantial and sufficient flexibility, to solve the life-cycle mismatch between the Embedded System and the Target System.

After a discussion of relevant techniques known in the art, we will describe in great detail novel techniques to solve that problem set.

The invention described herein must overcome a variety of technical challenges, including (but not limited to) the following:

It must, properly, detect whether a potentially unsafe, or unreliable, second system partition does (or does not) infringe a first system partition such that the first system partition's safe function will be impaired. Such impairment can be that the second system partition is not operating in accordance to its specification, for example by overheating, or by drawing too much current (so-called physical malfunctions), or by generating input data for the first system partition which may not represent legal or valid input data, or which may force the first system partition into an unsafe, or unspecified, system state. Such detection can be done by constantly monitoring the first system partition, its' health and appearance as well as the control and data signals that said second system partition inputs into the first system partition. For the aspects that second system partition controls the first system partition such control is to be monitored and, if found to lead to a potentially unsafe, or unspecified, state, such control must not be executed, or handed over, to the first system partition, or not be passed on to the first system partition. Obviously, as long as the second system partition only observes the first system partition, said first system partition can not be impaired by the second system partition.

The invention must further provide sufficient means to adopt to changes in the interfaces to the second system partition. As we aim to de-couple the life-cycle of the second system partition from the life-cycle of the first system partition, and as the second system partition may be changed, replaced, upgraded, or otherwise advance in its interfaces, flexibility in the connectivity to first system partition becomes important to re-establish the connectivity to the second system partition, or the advanced second system partition, for observing and/or controlling the first system partition.

Figure 4A:
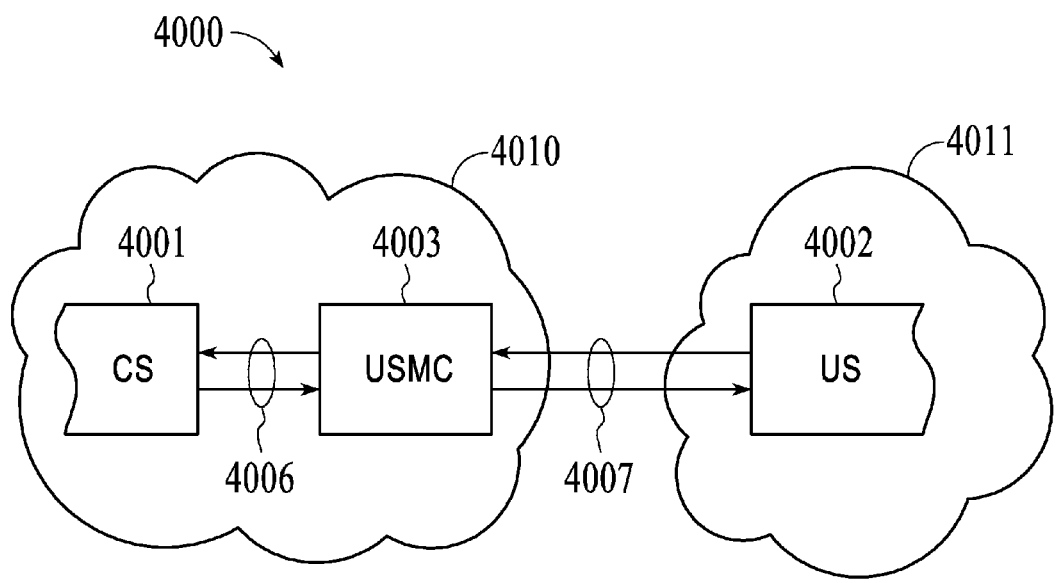
FIG. 4A and FIG. 4B provides a system-level overview of a partitioning in partitioned systems.

One embodiment of this invention is the system of FIG. 4A. A Control System CS 4001, which may represent said first system partition, for example, is connected via Communication Link CL 4006 to a User System Mediator Controller USMC 4003. Said USMC 4003, again, is connected via another Communication Link CL 4007 to a User System US 4002, which, for example, can be said second system partition.

The USMC 4003 does perform the above described monitoring and supervisory functions to warrant proper, safe functioning of CS 4001, in accordance to its' specifications, as well as proper, safe functioning of the overall system 4000, in accordance to its' specifications. Obviously, this monitoring and supervision done by the USMC is not meant to be a replacement of any monitoring and supervision already done the either CS 4001 or the overall system 4000. This overall system 4000 thereby partitions into two domains: One is the domain 4010 which can be called Safety Domain or Control System Domain, or Control System, and the domain 4011 which can be called user domain, consumer domain, user system domain, or user system. The monitoring and supervision performed by USMC 4003 is done in order maintain requirements of safety domain 4010 and to protect overall system 4000 or operators of overall system 4000 from harm when using any information that originates in user domain 4011.

Figure 4B:
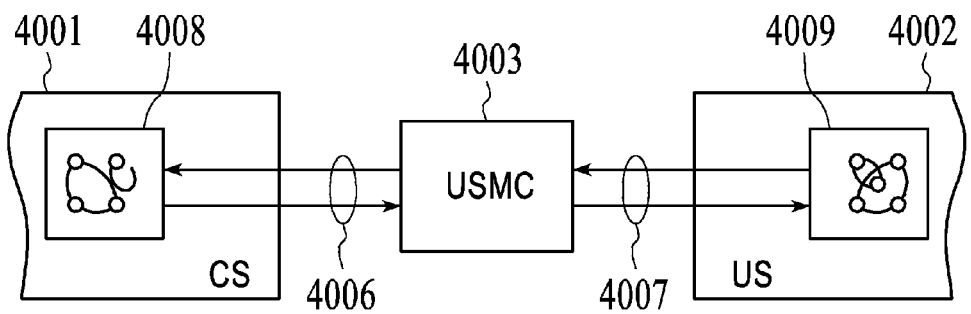

According to FIG. 4B, in another embodiment of this invention the USMC 4003 can have a companion automaton 4008 which supports and facilitates USMC 4003 in monitoring, or supervising, the safe functioning of CS 4001 in accordance to its' specifications, by observing and/or controlling. It is important to mention that this companion automaton 4008 may be physically separate from USMC 4003. For example, companion automaton 4008 may be a dedicated ECU, or it may be a SW subroutine running in the system partition CS 4001. In yet another embodiment of this invention the USMC 4003 can have another companion automaton 4009 which support and facilitates USMC 4003 in observing and/or controlling the safe functioning, in accordance to its' specifications, of US 4002. Similar to companion automaton 4008 the companion automaton 4009 may be physically separate from USMC 4003. For example, companion automaton 4009 may be a dedicated ECU, or it may be a SW subroutine running in the system partition US 4002.

Figure 5A:
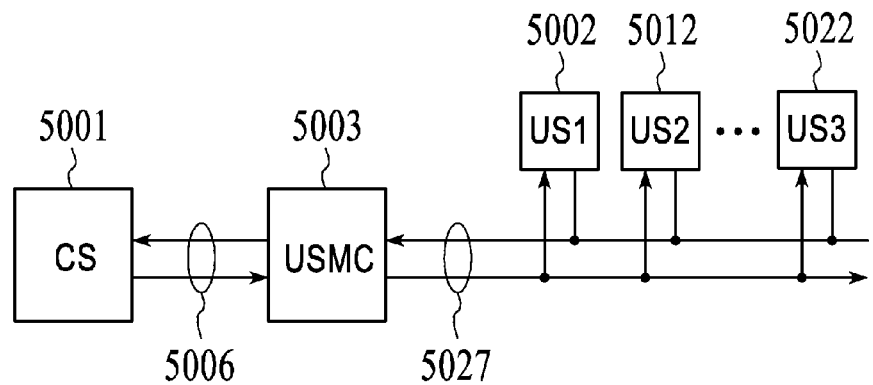
FIG. 5A, FIG. 5B, FIG. 5C, FIG. 5D, FIG. 5E and FIG. 5F illustrate connectivity options for partitioning embedded systems.

In yet another embodiment the invention is the system of FIG. 5A where a USMC 5003, which may be USMC 4003 of FIG. 4A or FIG. 4B, is connected via a Communication Link CL 5006 to a Control System CS 5001. CS 5001 can, for example, be CS 4001 of FIG. 4A or FIG. 4B. USMC 5003 is further connected to two, or more, User System, for example US1 5002, US2 5012, and US3 5022. Connectivity between USMC 5003 and the two, or more, User System is established via shared Communication Link CL 5027.

Figure 5B:
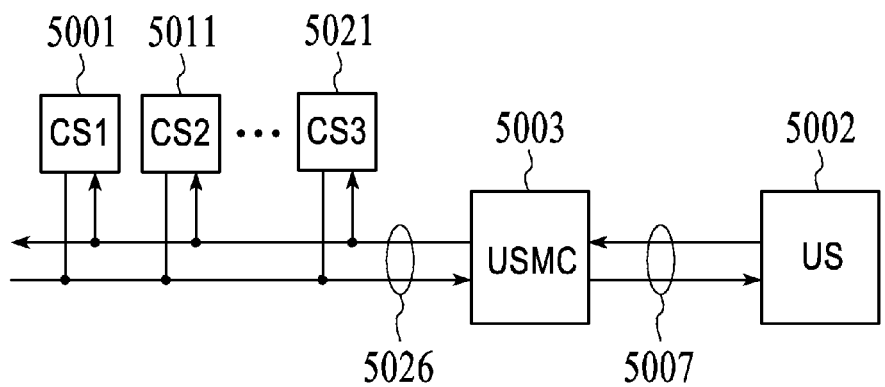

In yet another embodiment shown in FIG. 5B where a USMC 5003, which may be USMC 4003 of FIG. 4A or FIG.

4B, is connected via a Communication Link CL 5007 to a User System US 5002. US 5002 can, for example, be US 4002 of FIG. 4A or FIG. 4B. USMC 5003 is further connected to two, or more, Control System, for example CS1 5001, CS2 5011, and CS3 5021. Connectivity between USMC 5003 and the two, or more, Control System is established via shared Communication Link CL 5026.

Figure 5C:
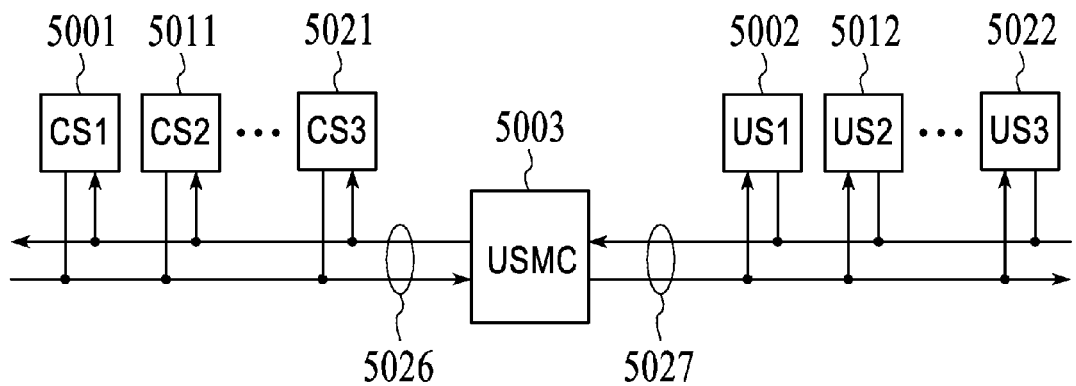

In yet another embodiment of this invention the invention is the system of FIG. 5C where a USMC 5003, which may be USMC 4003 of FIG. 4A or FIG. 4B, is connected to two, or more, Control System, for example CS1 5001, CS2 5011, and CS3 5021. Connectivity between USMC 5003 and the two, or more, Control System is established via shared Communication Link CL 5026. USMC 5003 is further connected to two, or more, User System, for example US1 5002, US2 5012, and US3 5022. Connectivity between USMC 5003 and the two, or more, User System is established via shared Communication Link CL 5027.

Figure 5D:
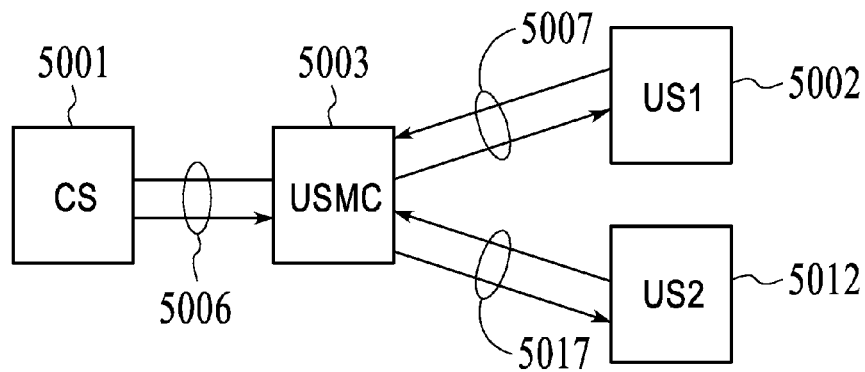

In yet another embodiment of this invention the invention is the system of FIG. 5D where a USMC 5003, which may be USMC 4003 of FIG. 4A or FIG. 4B, is connected via a Communication Link CL 5006 to a Control System CS 5001. CS 5001 can, for example, be CS 4001 of FIG. 4A or FIG. 4B. USMC 5003 is further connected to two, or more, User System, for example US1 5002, US2 5012. Connectivity between USMC 5003 and the two, or more, User System is established via dedicated Communication Link CL 5007 and dedicated Communication Link CL 5017.

Figure 5E:
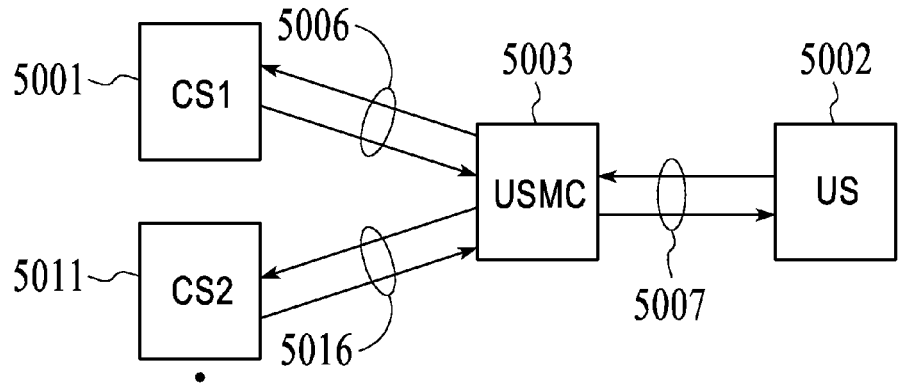

In yet another embodiment of this invention the invention is the system of FIG. 5E where a USMC 5003, which may be USMC 4003 of FIG. 4A or FIG. 4B, is connected via a Communication Link CL 5007 to a User System US 5002. US 5002 can, for example, be US 4002 of FIG. 4A or FIG. 4B. USMC 5003 is further connected to two, or more, Control System, for example CS1 5001, CS2 5011. Connectivity between USMC 5003 and the two, or more, Control System is established via dedicated Communication Link CL 5006 and dedicated Communication Link CL 5016.

Figure 5F:
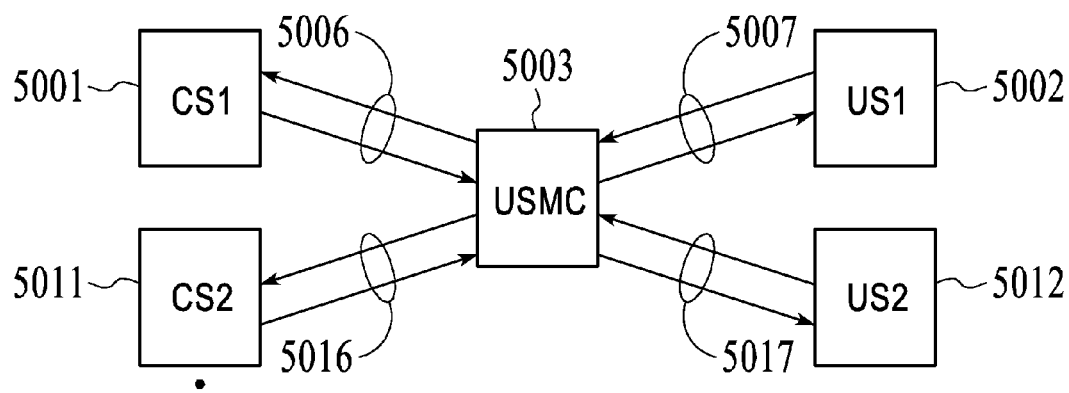

And, in yet another embodiment of this invention the invention is the system of FIG. 5F where a USMC 5003 may be USMC 4003 of FIG. 4A or FIG. 4B. USMC 5003 is connected to two, or more, Control System, for example CS1 5001, CS2 5011. Connectivity between USMC 5003 and the two, or more, Control System is established via dedicated Communication Link CL 5006 and dedicated Communication Link CL 5016. USMC 5003 is further connected to two, or more, User System, for example US1 5002, US2 5012. Connectivity between USMC 5003 and the two, or more, User System is established via dedicated Communication Link CL 5007 and dedicated Communication Link CL 5017. Our invention supports a wide variety of communication standards, or combinations thereof, for connecting to the USMC, for example USMC 4003 of FIG. 4A or FIG. 4B, or USMC 5003 of FIG. 5A, FIG. 5B, FIG. 5C, FIG. 5D, FIG. 5E and FIG. 5F. While the connectivity in the Safety Domain in general follows certain approved standards for fail-safe, and/or reliable, and/or resilient, and/or secure communication, our invention has a lot of flexibility in the connectivity. Connectivity to the Safety Domain, for example Communication Link CL 4006 of FIG. 4A or FIG. 4B, or Communication Link CL 5006, or 5016, or 5026 of FIG. 5A, FIG. 5B, FIG. 5C, FIG. 5D, FIG. 5E and FIG. 5F, can be any one, or more, of: CAN, MOST, FlexRay, LIN, EtherCat, ProfiNET, Sercos, TTCAN, CANOpen, IO-Link, SPI, IIC, TCP/IP v4, TCP/IP v6, IPsec, WiFi, AFDX, RS232, RS485, or any other current, or many other future connectivity standard. Obviously, for a so-called shared Communication Link, as it is, for example Communication Link CL 5026 of FIG. 5B and FIG. 5C, only those communication standards apply which support bus-like (such as CAN, for example) or network-like (such as Ethernet, for example) topologies, or are suitable and commonly used for connecting two, or more, system partitions. The same is true for so-called dedicated Communication Link, such as, for example Communication Link CL 5006 or CL 5016 of FIG. 5E and FIG. 5F. Any Communication Link standard suitable for connecting exactly two system partitions, regardless whether client-server-like, or peer-to-peer-like, can be used in our invention.

While the connectivity in the Consumer Domain generally follows certain Consumer Electronics standards, our invention has a lot of flexibility in the connectivity. For example connectivity to the user domain, for example Communication Link CL 4007 of FIG. 4A or FIG. 4B or CL 5007 or CL 5017 or CL 5027 of FIG. 5A, FIG. 5B, FIG. 5C, FIG. 5D, FIG. 5E and FIG. 5F can be an one, or more, of the following standards: USB 2.0, USB 3.0, PATA, SATA, PCIe V2.0, PCIe V3.0, WiFi, Ethernet, TCP/IP v4, TCP/IP v6, IPsec, RS232, SPI, IIC, IO-Link, GPIO, or any other current, or many other future connectivity standard. Obviously, for a so-called shared Communication Link, as it is, for example Communication Link CL 5027 of FIG. 5A, and FIG. 5C, only those communication standards apply which support bus-like (such as CAN, for example) or network-like (such as Ethernet, for example) topologies, or are suitable and commonly used for connecting two, or more, system partitions. The same is true for so-called dedicated Communication Link, such as, for example Communication Link CL 5007 or CL 5017 of FIG. 5D and FIG. 5F. Any Communication Link standard suitable for connecting exactly two system partitions, regardless whether client-server-like, or peer-to-peer-like, can be used in our invention.

The wide support of Communication Link standards in, either the Safety Domain or the user domain, becomes possible by the configurability of the underlying system partition, HW, FW, or SW, of the USMC, an aspect which is described in great detail below in this document.

Figure 6:
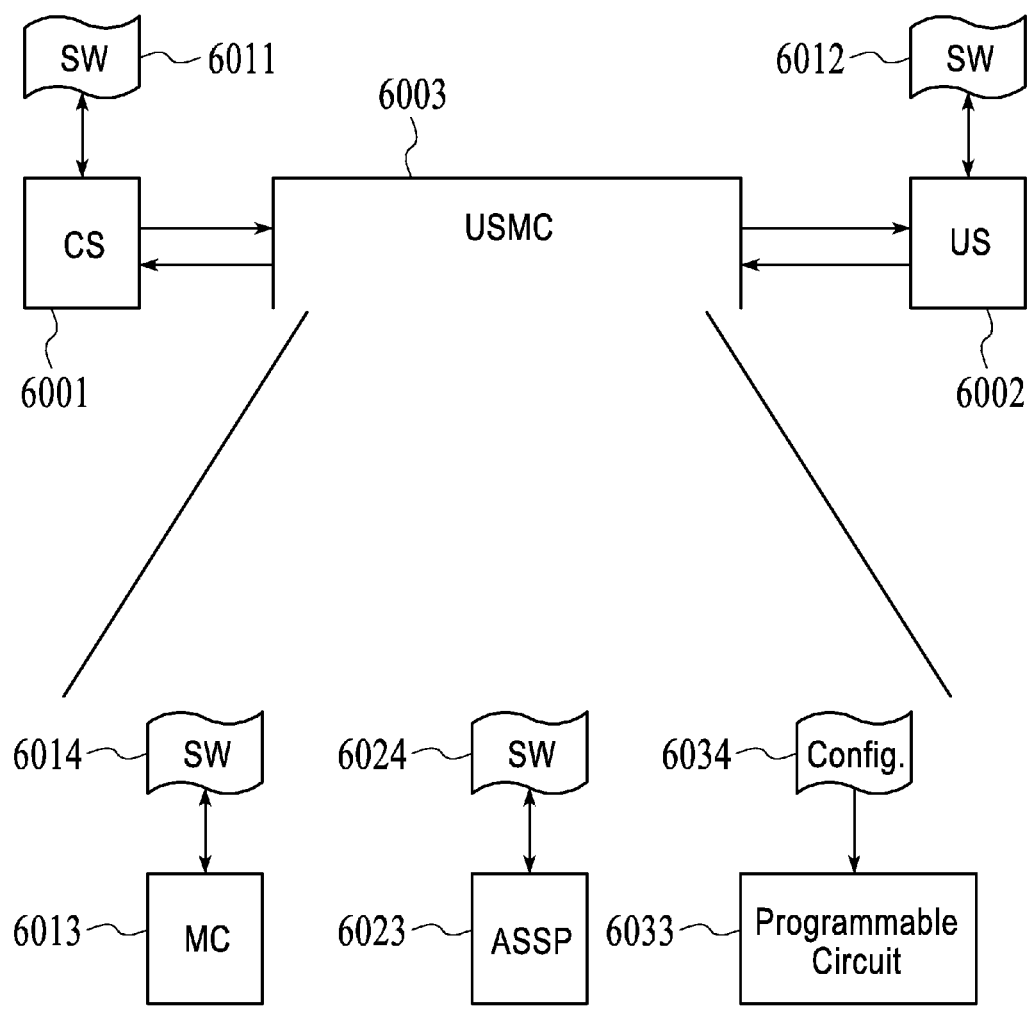
FIG. 6 shows component choices for partitioned embedded systems.

Another embodiment of this invention is described in FIG. 6 where a Control System CS 6001 is a data processing system executing the computer program 6011 and a User System US 6002, also a data processing system executing the computer program 6012, are connected to each other indirectly via a User System Mediator Controller USMC 6003. In one embodiment of this invention USMC 6003 is a microcontroller system uC 6013, executing a microcontroller program 6014. In another embodiment of this invention USMC 6003 is an ASSP 6023, executing a computer program 6024. In yet another embodiment of this invention USMC 6003 is a Configurable System comprising programmable circuitry 6003, configured via Configuration Description 6034.

The versatility of the User System Mediator Controller to a large extend stems from its' ability to not only be programmable in SW but also to be configurable in HW. SW, in this context, is human and/or machine readable instructions that can be executed by a CPU, a DSP, an ASSP, and/or a SOC. HW, in this context, is analog and/or digital circuitry which can be configured, for example an FPGA, or an FPAA, or a PLD, or a CPLD, or one or more combinations thereof assembled on a PCB.

As a result of this versatility a wide variety of system partitions can be connected to the User System Mediator Controller.

In the Safety Domain one, or more, Control System, such as CS 4001 of FIG. 4A or FIG. 4B, or CS 5001 or CS 5011 or CS 5021 of FIG. 5A, FIG. 5B, FIG. 5C, FIG. 5D, FIG. 5E and FIG. 5F, can be one or more of the following:

An ECU which is an Electronic Control Unit as it is, for example, integrated in automotive applications. An anti-lock brake system or an engine controller is a typical automotive example of an automotive Embedded System which comprises an ECU. Obviously, ECUs can also be found in other vehicles such as locomotive train engines and train cars, marine vessels, aeroplanes, space aircrafts, and rockets, for example.

A PLC which is a Programmable Logic Controller as it is, for example, used in industrial applications.

A controller for a conveyor belt system is a typical example for an industrial Embedded System which comprises a PLC. Obviously, PLCs can also be used for controlling manufacturing plants, manufacturing machinery, robotic arms, power plants, printing machines, for example.

An RTC which is a Real-time Controller as it is, for example, used in certain closed-loop control systems. A controller which adjusts the temperature based on a thermostat in an HVAC, which is a Heating/Ventilation/Air Conditioning system, is a typical example of an Embedded System which comprises an RTC.

A medical diagnostic and/or imaging system used for examination of patients, for example. A Computer Tomograph is a typical example of such an Embedded System.

A system partition or a component which must be designed and/or built in accordance to SIL, for example.

A system partition or a component which must be designed and/or built in accordance to ASIL, for example.

A system partition or a component which must be designed and/or built in accordance to DIN/ISO 26262, for example.

A system partition or a component which must be designed and/or built in accordance to ISO 61508, for example.

A system partition or a component which must be designed and/or built in accordance to MRL, for example.

In the user domain one, or more, User System such as US 4002 of FIG. 4A or FIG. 4B, or US 5002 or US 5012 or US 5022 of FIG. 5A, FIG. 5B, FIG. 5C, FIG. 5D, FIG. 5E and FIG. 5F, can, for example, be one or more of the following:

A PC which is a Personal Computer.

A Laptop which is a compact, portable PC.

A Notepad which is a more compact Laptop.

A Tablet which is a Notepad and which typically uses a touch display for MMI.

A Smart-phone such as the Apple iPhone, or an Android smart-phone.

A Multimedia Player such as a DVD Player with a display and loudspeakers.

A Gaming Station for personal, handheld computer gaming.

A PND which is a Personal Navigation Device, typically a portable, handheld device for displaying and navigating electronic maps using a GPS.

A CES which is a Consumer Electronic System which, typically, is a portable, handheld device for consumers to browse the Internet.

A Mobile Phone.

An IVI which, for example, is described in Glaeser, S. and et al. (2011); Multimediasystem fuer ein Fahrzeug; Patent Application WIPO 02/093829, WIPO, which is hereby included by reference.

The ability to adapt the connectivity at the electrical level, the physical level, the transport level, or even the protocol level gives superior flexibility, when compared to Glaeser, S. and et al. (2011); Multimediasystem fuer ein Fahrzeug; Patent Application WIPO 02/093829, WIPO, for example, where one and only one predetermined interface (interface 5 in FIG. 1 therein) can be supported. Our invention also exceeds the connectivity described in Moeller, A. and et al. (1990); On-Board Network for Motor Vehicles; U.S. Pat. No. 4,942,571, USPTO, for example, or in Sackman, D. J. and et al. (1992); Apparatus for Networking Programmable Logic Controllers to Host Computers; U.S. Pat. No. 5,159,673, USPTO, for example, or in Itoi, M. (2007); Controller Area Network (CAN) Communication Device; U.S. Pat. No. 7,289,446, USPTO, for example, or in Kuban, P. A. (2011); Extension of Wired Controller Area Network to Wireless Personal Area Networks; U.S. Pat. No. 7,991,351, USPTO, for example, which all describe networked-ness and connectivity predominantly targeted for the Safety Domain, but which fail to teach how to change, adapt, upgrade, replace the particular underlying Communication Link with a different Communication Link.

To effectively, safely, and efficiently de-couple the two domains, the Safety Domain and the user domain, a User System Mediator Controller, for example USMC 4003 of FIG. 4A or FIG. 4B or USMC 5003 of FIG. 5A, FIG. 5B, FIG. 5C, FIG. 5D, FIG. 5E and FIG. 5F or USMC 6003 of FIG. 6, does provide a multitude of connectivity, data transport, and monitoring functionality. These can be one, or more, of the following:

In one embodiment of this invention the USMC is a Firewall which ensures that certain data, or certain signals either get blocked or do pass from one domain to the other domain. For example, the USMC can be the Firewall as it is described in Coss, M. J. and et al. (2000); Methods and Apparatus for a Computer Network Firewall with Stateful Packet Filtering; U.S. Pat. No. 6,141,749, USPTO, which is hereby included by reference. Or, the USMC can be the Firewall as it is described in Balakrishnan, S. and et al. (2007); Stateful Packet Content Matching Mechanisms; Patent Application WIPO 2007/120165, WIPO, which is hereby included by reference. Or, the USMC can be the Firewall as it is described in Luft, S. J. and et al. (2010); Network Element Architecture for Deep Packet Inspection; U.S. Pat. No. 7,719,966, USPTO, which is hereby included by reference. Or, the USMC can be the Firewall as it is described in Balakrishnan, S. and et al. (2009); Multi-Pattern Packet Content Inspection Mechanism Employing Tagged Values; U.S. Pat. No. 7,624,436, USPTO, which is hereby included by reference. Or, the USMC can be the Firewall as it is described in Matityahu, E. and et al. (2009); Active Packet Content Analyzer for Communications Network; U.S. Pat. No. 7,499,412, USPTO, which is hereby included by reference. Or, the USMC can be the Firewall as it is described in Bagepalli, N. and et al. (2009); Highly Scalable Architecture for Application Network Appliances; Patent Application WIPO 2009/032097, WIPO, which is hereby included by reference. Or, the USMC can be the Firewall as it is described in Varadarajan, S. and et al. (2011); System and Method for Deep Packet Inspection; U.S. Pat. No. 8,068,431, USPTO, which is hereby included by reference. Obviously, the concepts described therein— and similar concepts known in the art—can be adopted to any other packet-based Communication Link, not just TCP/IP or UDP, such as, for example, CAN or Flexray or USB.

In another embodiment of this invention the USMC acts as a Filter to filter information passing between the two domains. Such a Filter can be used to filter out information so that it does not pass from one domain to the other. Sometimes the Filter exhibits similar behavior as the aforementioned Firewall. Or, the Filter only lets pass particular information from one domain to the other. The USMC can filter information as it is described, for example, in Lukovsky, J. A. (2005); System and Method for a Process Attribute Based Computer Network Filter; U.S. Pat. No. 6,868,450, USPTO, which is hereby included by reference. Or, the USMC can filter information as it is described, for example, in Swander, B. D. and et al. (2008); Method for Managing Network Filter Based Policies; U.S. Pat. No. 7,409,707, USPTO, which is hereby included by reference.

In another embodiment of this invention the USMC functions like a communication Bridge where it forwards certain information, data, or signals from one system partition in one domain to another system partition in the other domain. Various approaches for a Bridge are known in the art that can be applied to the USMC. For example, the Bridge described in Leone, M. J. (1990); Local Area Network Bridge; U.S. Pat. No. 4,922,503, USPTO, which is hereby included by reference, or the Bridge described in Reinold, J. and et al. (2005); Vehicle Active Network with Backbone Structure; U.S. Pat. No. 6,931,004, USPTO, which is hereby included by reference, or the Bridge which is described in Hardisty, T. and et al. (2011); Communications Network Bridge and a Communications System Comprising Such a Bridge; U.S. Pat. No. 8,068,505, USPTO, which is hereby included by reference.

In yet another embodiment of this invention the USMC can perform functionality common to a Router: The USMC takes certain information, data, or signals from one domain and sends it to one particular, or more, system partitions in the other domain. For example, the USMC can provide the functionality of the Router described in Sugai, K. and et al. (2006); Network Routing Apparatus; U.S. Pat. No. 7,088,716, USPTO, which is hereby included by reference, or the Router described in Muranaka, T. and et al. (2008); Network Routing Apparatus; U.S. Pat. No. 7,379,456, USPTO, which is hereby included by reference.

In yet another embodiment of this invention the USMC acts as a Gateway between the Safety Domain and the user domain, or vice versa, by receiving information, data, or signals from one, or more, system partitions in one domain, translating, transposing, or altering said information, data, or signals to make it suitable to be sent to one, or more, system partition in the other domain. This is an important functionality because in a typical use case the communication protocols used by system partitions in one domain likely are different from the communication protocols used by system partitions in the other domain. Various approaches for such Gateways are known in the art, depending on the protocols involved. For example, the USMC can be the Gateway described in Skoog, F. H. (2000); Signaling Network Gateway Device and Method for Use in a Signaling Network; U.S. Pat. No. 6,081,591, USPTO, which is hereby included by reference, or the Gateway described in Wiegel, S. L. (2000); Network Gateway Mechanism Having a Protocol Stack Proxy; U.S. Pat. No. 6,131,163, USPTO, which is hereby included by reference, or the Gateway described in Darland, T. and et al. (2001); Advanced Intelligent Network Gateway; U.S. Pat. No. 6,229,819, USPTO, which is hereby included by reference.

In yet another embodiment of this invention the USMC performs the functionality of a Proxy, for example to intercept the information, data, or signals going from one domain to the other domain. In one preferred embodiment of this invention the USMC effectively proxies certain services, information, data, or signals, from one, or more, system partitions in the Safety Domain, to make them available for observing, or monitoring, or displaying by system partitions in the user domain. For example, certain temperature values, pressure values, voltages, and other sensor values used internal to the Safety Domain for processing by system partitions in the Safety Domain, can be proxied, or relayed, for monitoring, or for display, or for processing by system partitions in the user domain. The benefit of a proxy is that the system partition of the user domain does not have to directly communicate with system partitions in the Safety Domain. This can increase the robustness and the safety, for example, of the system partitions in the Safety Domain. Various concepts and methods are known in the art to build such Proxy. For example, the USMC can implement some, or all, of the Proxy described in Green, M. W. and et al. (1999); Secure Network Proxy for Connecting Entities; U.S. Pat. No. 6,003,084, USPTO, which is hereby included by reference, or the Proxy described in Knauerhase, R. C. and et al. (2002); Network Proxy Capable of Dynamically Selecting a Destination Device for Servicing a Client Request; U.S. Pat. No. 6,345,303, USPTO, which is hereby included by reference, or the Proxy described in Waldo, J. H. (2004). Network Proxy; U.S. Pat. No. 6,708,171, USPTO, which is hereby included by reference, or the Proxy described in Jr., R. L. G. and et al. (2005); Distributed Element Network Management; U.S. Pat. No. 6,963,911, USPTO, which is hereby included by reference, or the Proxy described in Bakshi, S. (2007); Secure Proxy Mobile Apparatus, Systems, and Methods; U.S. Pat. No. 7,313,394, USPTO, which is hereby included by reference, or the Proxy described in Hayball, C. C. (2009); Network Proxy Apparatus and Methods; U.S. Pat. No. 7,565,407, USPTO, which is hereby included by reference.

To extend data safety and security, for example, the USMC can transport information, data, or signals from one domain to the other domain via a Tunnel. This effectively protects the information, data, or signals sent by one, or more, system partitions in one domain when shared Communication Link are used. Such a Tunnel can use encryption and/or other security means to protect the information, data, or signals from being visible to any other system partition other than the system partitions it is meant for. A Tunnel can also protect from intercepting information, data, or signals and can also protect from so-called man-in-the-middle attacks. Therefore, in one embodiment of this invention the USMC performs functionality of a Tunnel as it is, for example, described in Ullas, V. and et al. (2011); System and Method for Automated Discovery of Customer-Edge Devices and Interface Connections in a Virtual-Private-Networking Environment; Patent Application WIPO 2011/126483, WIPO, which is hereby included by reference, or as it is, for example, described in Matsuhira, N. (2011); Communication Device Having VPN Accommodation Function; Patent EPO 2 375 644, EPO, which is hereby included by reference, or as it is, for example, described in Moon, B. and et al. (2005); Establishing a Virtual Private Network for a Road Warrior; Patent Application WIPO 2005/069864, WIPO, which is hereby included by reference, or as it is, for example, described in Gilbrech, S. A. (2001); Apparatus for Implementing Virtual Private Networks; U.S. Pat. No. 6,173,399, USPTO, which is hereby included by reference, or as it is, for example, described in Rekhter, Y. and et al. (2003); Virtual Private Network Employing Tag-Implemented Egress-Channel Selection; U.S. Pat. No. 6,526,056, USPTO, which is hereby included by reference, or as it is, for example, described in Genty, D. M. and et al. (2003); Method and System for Virtual Private Network Administration Channels; U.S. Pat. No. 6,614,800, USPTO, which is hereby included by reference, or as it is, for example, described in Kompella, K. (2006); Transport Networks Supporting Virtual Private Networks, and Configuring Such Networks; U.S. Pat. No. 7,136,374, USPTO, which is hereby included by reference, or as it is, for example, described in Sundarrajan, P. and et al. (2010); System and Method for Establishing a Virtual Private Network; U.S. Pat. No. 7,757,074, USPTO, which is hereby included by reference.

Obviously, the USMC can combine the aforementioned functionalities and can, for example, be one, or more, of a Firewall, a Filter, a Bridge, a Router, a Gateway, a Proxy, a Tunnel, possibly even at the same time, if necessary to meet the applications requirement.

Figure 7A:
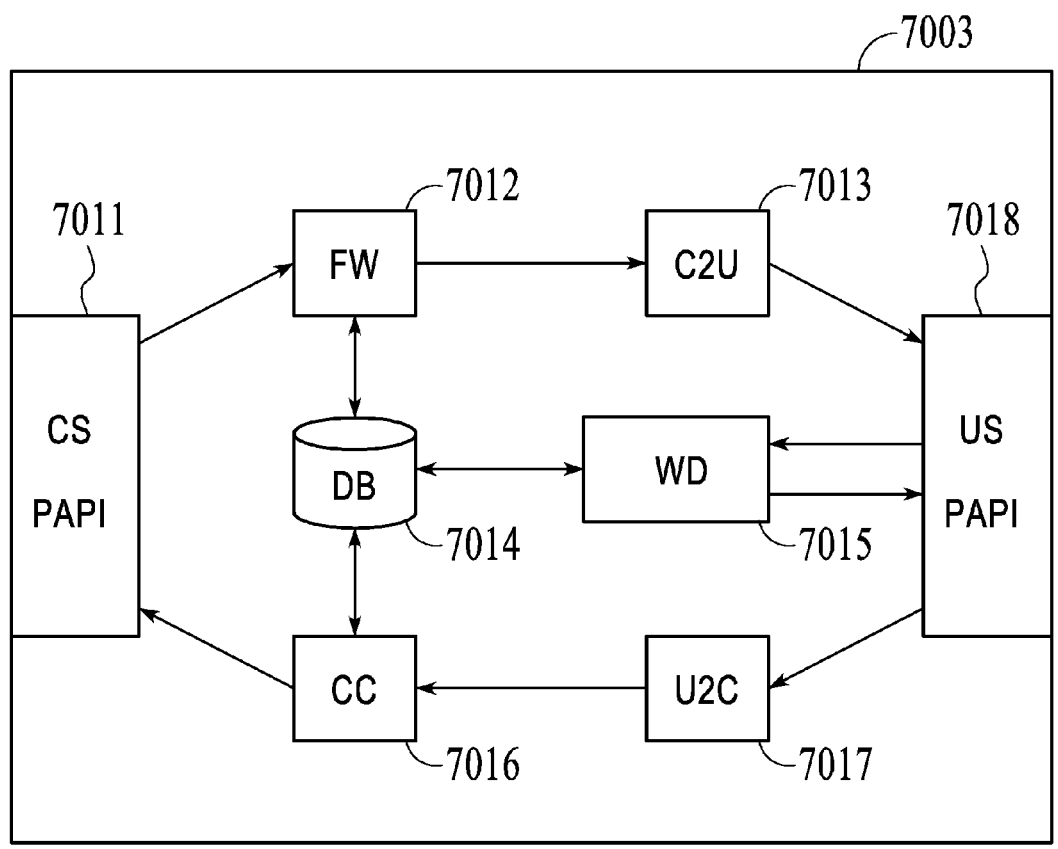
FIG. 7A and FIG. 7B show details of a User System Mediator Controller.

As such, the USMC can, in one preferred embodiment of this invention be the USMC 7003 of FIG. 7A. This USMC comprises a User System Protocol Application Procedure Interface USPAPI 7018. The USPAPI 7018 interfaces with the one, or more, system partitions in the user domain. It can support multiple Communication Link and protocols, at physical-level, at electrical-level, at transaction-level, and/or at higher ISO/OSI communication levels. The USPAPI 7018 can perform some of the above mentioned Filter functions, for example by not transporting certain information, data, or signals from system partitions in the user domain. In combination with the User System to Control System Block U2C 7017, it can perform the Gateway function. U2C 7017 which receives its inputs from the USPAPI 7018 can also translate, transform, or transpose the information, data, or signals from the one, or more, User System into a format, or protocol, or data representation, suitable for processing by system partitions in the Safety Domain. The U2C 7017 can also perform Bridge functionality to transport information, data, or signals from one, or more, User System to one, or more, Control System. USMC 7003 additionally has a Controller Checker CC 7016 which can, for example, perform certain Firewall functionality to drop information, data, or signals that shall not pass through to the Safety Domain. This is done by receiving information, data, or signals from the U2C 7017 and, based on predetermined algorithms, heuristics, or rules, by transporting the information, data, or signals to the Control System Protocol Application Procedure Interface CSPAPI 7011. Said algorithms, heuristics, or rules, can access the Database DB 7014. Database DB 7014 can be used by the CC 7016 to share past information, data, or signals, or prior states of the CC 7014.

Database DB 7014 can also store past information, data, or signals, or prior states of Watchdog WD 7015. Database DB 7014 can also store past information, data, or signals, or prior states of the Firewall FW 7012.

CSPAPI 7011 interfaces with the one, or more, system partitions in the Safety Domain. Therefore, it can support multiple Communication Link and protocols, at physical-level, at electrical-level, at transaction-level, and/or at higher ISO/OSI communication levels. The CSPAPI 7011 can also perform Filter functionality, for example by not passing through certain information, data, or signals from one, or more, system partitions in the Safety Domain. In combination with Firewall FW 7012 Gateway and/or Firewall functionality can be implemented: information, data, or signals from one, or more, system partitions in the Safety Domain can be blocked and/or forwarded to one, or more, system partitions in the user domain. For this, FW 7012 can access the Database DB 7014 and received, or store, past information, data, or signals, or prior states.

The Control System to User System Block C2U 7013 receives its input from said Firewall FW 7012. The information, data, or signals is then translated, or transformed, or transposed into a format, protocol, or data representation suitable for the one, or more, system partitions in the user domain. Such data is provided to the USPAPI 7018 for access by the one, or more, system partitions of the user domain. This, to some respect, provides a Bridge functionality, as well.

The USMC 7003 can also have a powerful Watchdog Block WD 7015. This Watchdog WD 7015 takes care of safe interaction between any system partition in the user domain with the Control System. For example, based on information from the CC 7016 and/or FW 7012, which can be stored in the Database DB 7014, for example, the WD 7015 can perform Router functionality, and/or Proxy functionality, and/or Tunnel functionality. Router functionality can, for example, be done by the WD 7015 inserting, or changing, algorithms, heuristics, or rules in the Database DB 7014, which then impact the behavior of the CC 7016 or the FW 7012.

Proxy functionality can be done in a similar way: WD 7015 stores past information, data, or signals or current information, data, or signals in Database DB 7014. This is the accessed by CC 7016 who presents it to one, or more, system partitions in the Safety Domain, via CSPAPI 7011. Or, this is then accessed by the FW 7012 who presents it to USPAPI 7018, after processing in C2U 7013, such that the information, data, or signals is then accessible by one, or more, system partitions in the user domain. Using the Database DB 7014 Proxy functionality can also include caching to reduce the Communication Link load.

In combination with WD 7015 and DB 7014, the USPAPI 7018 as well as the CSPAPI 7011 can also perform Tunnel functionality. For example, certain system partitions can use encryption, or other tunneling techniques for secure communication, to have a Virtual Private Communication Link, despite being on a shared Communication Link with other system partitions of the same domain. This is of particular importance when sensitive information, data, or signals, for example, from the Safety Domain, shall only be provided to very special system partitions in the user domain, but not to any others. Or, when very special system partitions in the user domain shall provide information, data, or signals, for example, for controlling the Safety Domain, but it must be ensured that other system partitions in the user domain do not interfere. For that, WD 7015 can use DB 7014 and can interact with USPAPI 7018 to provide additional safety and security measures to be utilized by the one, or more, User System. Various measure can be provided by the USMC:

One, or more, system partitions in the user domain can be registered and as such can have certain privileges in interacting with the Control System. Registration can occur by data exchange between a stub in the User System, for example, the stub 4009 of FIG. 4B. The existence of such a stub may be used to validate the User System to interact with the USMC and, thereby, with the Control System. In one preferred embodiment of this invention, the User System can identify itself to the USMC for interacting with the Control System.

In another preferred embodiment of this invention the User System would authenticate itself to the USMC. Various concepts for authentication, more or less sophisticated, are known in the art. For example, one, or more, system partitions of the user domain can authenticate themselves using the concepts described in See, M. E. and et al; (2000). Deterministic User Authentication Service for Communication Network; U.S. Pat. No. 6,070,243, USPTO, which is hereby included by reference, or the concepts described in Hemsath, D. K. (2005); Secure Shell Protocol Access Control; U.S. Pat. No. 6,851,113, USPTO, which is hereby included by reference, or the concepts described in See, M. E. and et al. (2005); Deterministic User Authentication Service for Communication Network; U.S. Pat. No. 6,874,090, USPTO, which is hereby included by reference, or the concepts described in Roux, P. and et al. (2010); Method and Apparatus for User Authentication; U.S. Pat. No. 7,725,717, USPTO, which is hereby included by reference, or the concepts described in Hall, B. and et al. (2011); Serialized Enforced Authenticated Controller Area Network; Patent US 2011/0103390, USPTO, which is hereby included by reference.

Figure 7B:
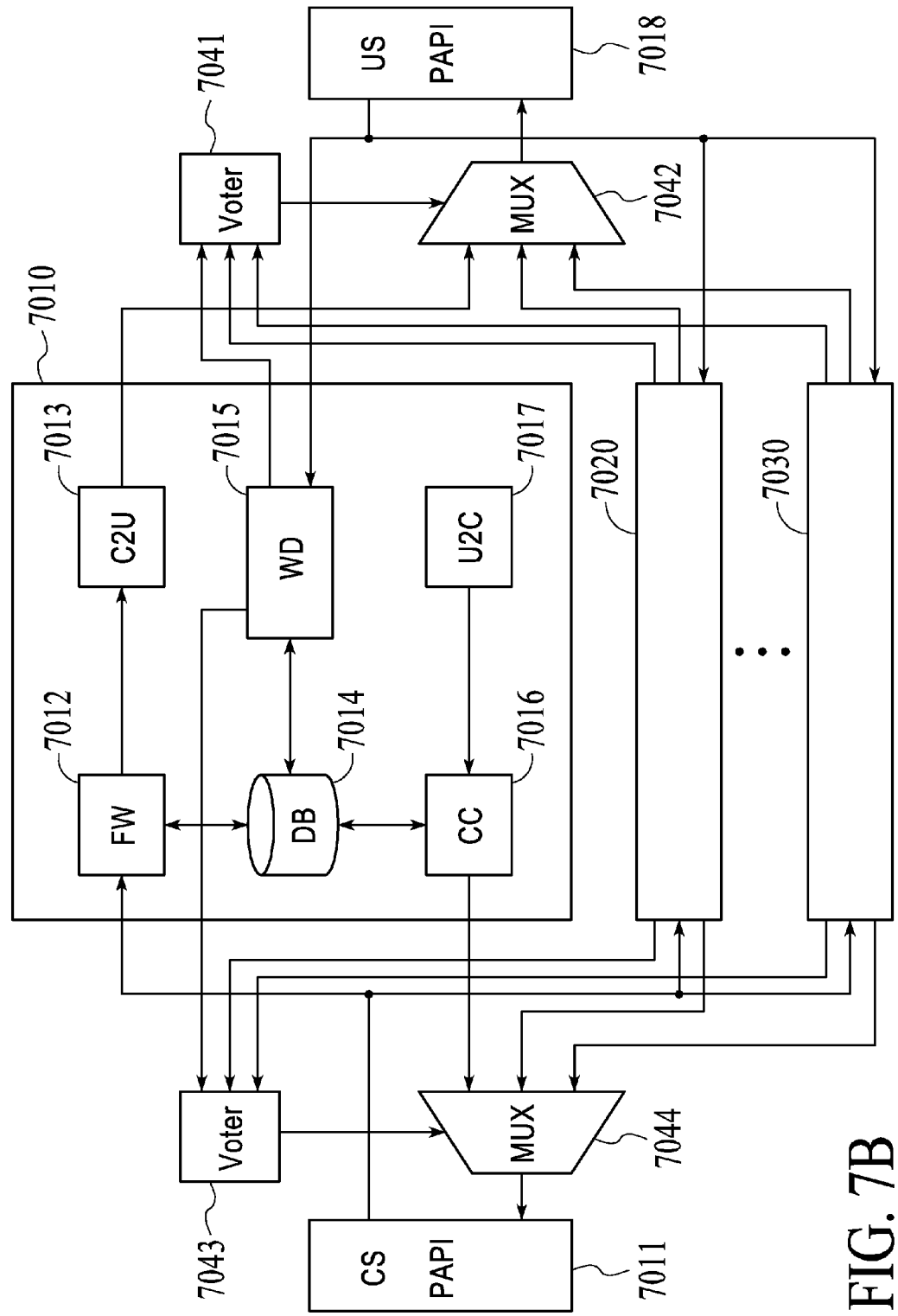

Authentication may happen once, prior to interaction between the User System and the USMC, or authentication may happen on an ongoing basis. As a result of such authentication a system partition of the user domain may sufficiently be trusted to interact with the Control System via the USMC. Obviously, the USMC may have different trust levels with different system partitions, or may change trust levels in the course of operation. Trust levels can be managed by the Watchdog, for example WD 7015 of FIG. 7, and can be held persistent in a database, for example Database DB 7014 of FIG. 7A and FIG. 7B. Overall, different levels of validating the system partitions in the user domain are possible, ranging from simple detection, over registering, identification, authentication, all the way to ongoing challenge-response authentication methods. By having an ongoing validation the USMC can ensure, from time to time, that the one, or more, system partitions of the user domain are eligible to interact with the Control System.

The USMC, thereby, can also monitor the livelihood, stability, consistency, trustedness, fitness, and/or health of the User System. For example, the User System may be sending a so-called heartbeat signal indicating its livelihood. Information about the livelihood, stability, consistency, trustedness, fitness, and/or health can be embedded into that heartbeat. Or, the User System can be sending a so-called keep-alive signal to the USMC to keep the connection to the USMC alive and valid. Health and/or fitness data can be hash sums, MD5 sums, Cyclic Redundancy Check (CRC) sums, system parameters, local physical sensor readings, which by itself, or in combination, enable the USMC to decide on the livelihood, stability, consistency, trustedness, fitness, and/or health of the User System and/or at least one system partition of the user domain.

Various concepts for such livelihood, stability, consistency, trustedness, fitness, and/or health monitoring and detection are known in the art, that can be applied to the USMC. For example, the concepts described in Gibart, A. G. and et al. (2003); Network Delay Monitor for Safety Control Networks; U.S. Pat. No. 7,366,774, USPTO, which is hereby included by reference, or the concepts described in Konz, D. W. and et al. (2009); System and Method for Maintaining Proper Termination and Error-Free Communication in a Network Bus; U.S. Pat. No. 7,581,031, USPTO, which is hereby included by reference, or the concepts described in Temple, C. (2010); Arrangement and Method for Connecting a Processing Node in a Distribution System; U.S. Pat. No. 7,818,613, USPTO, which is hereby included by reference, can be used in the USMC.

The USMC can also monitor the information, data, or signals on the one, or more, Communication Link. This can be used to avoid malicious behavior and/or failures when using shared Communication Link, for example. Various concepts for such analysis are known in the art that can be used by the USMC: For example, the USMC can detect so-called Denial-of-Service attacks by one, or more, system partitions of the user domain. Or, the USMC can detect a so-called Babbling Idiot situation on one, or more, Communication Link.

The monitoring data, which can be from the one, or more, system partitions in the user domain or from the one, or more, Communication Link with the User System can be recorded for later analysis. Such Data Logging can, for example, be done by the Watchdog WD 7015 which receives such data from the USPAPI 7018 and stores it for later retrieval in the Database DB 7014. This also enables the USMC to make decisions on whether to block or to pass the information, data, or signals from, or to, the User System based on past information, data, or signals and/or based on prior systems states. In one embodiment of this invention the USMC can block Audio/Video data sent from the User System to the Control System, based on current information, data, or signals from the Control System. In one preferred embodiment of this invention the USMC blocks Audio/Video data from an IFE system in the User System upon a Passenger Attention Call in the Control System. In another preferred embodiment of this invention the USMC blocks Audio/Video data from a Media Player in the User System upon a certain state in the Control System, for example when a Control System detects that it is in motion. And in yet another embodiment of this invention the USMC has a model of at least one system partition of the Control System and, thereby, can decide whether an input from the User System may not be a legal information, data, or signals and/or may bring the Control System into an unsafe, or unspecified, or illegal state. In that case the USMC may decide to block the information, data, or signals from the User System to prevent unsafe operation. Optionally, the USMC may report back to the User System that said information, data, or signals may have been unacceptable and thus was blocked.

Sometimes it is important that the USMC maintains a high integrity and/or a high availability. This can, for example, be achieved by adding redundancy as it is described in FIG. 7B. In one embodiment of this invention the sensitive blocks of the USMC, for example the FW 7012, the C2U 7013, the DB 7014, the WD 7015, the CC 7016, and/or the U2C 7017 can be combined in a redundant Block 7010, which his instantiated more than once, for example in a second Block 7020, and/or a third Block 7030. In this case, a Voter 7041 controls via Multiplexor 7024 which output from which redundant Block, 7010, 7020, or 7030 is fed to the User System via USPAPI 7018. Similarly, another Voter 7043 controls via a Multiplexor 7044 which output of which Blocks, 7010, 7020, or 7030, goes to the Control System via CSPAPI 7011. Various concepts for adding reliability, integrity, and/or availability via redundancy are known in the art that can be applied to the USMC: For example, the fault tolerance of Bello, S. E. and et al. (2000). Fault-Tolerant Multiple Processor System with Signature Voting. U.S. Pat.

No. 6,128,755, USPTO, which is hereby included by reference, can be used. Or the concepts described in Glaser, R. S. and et al. (2002); Process Control Interface System Having Triply Redundant Remote Field Units; Patent EPO 1 193 576, EPO, which is hereby included by reference, or the concepts described in Glaser, R. S. and et al. (1993); Process Control Interface Having Triply Redundant Remote Field Units; Patent Application WIPO 93/20488, WIPO, which is hereby included by reference, can be used.

Figure 8:
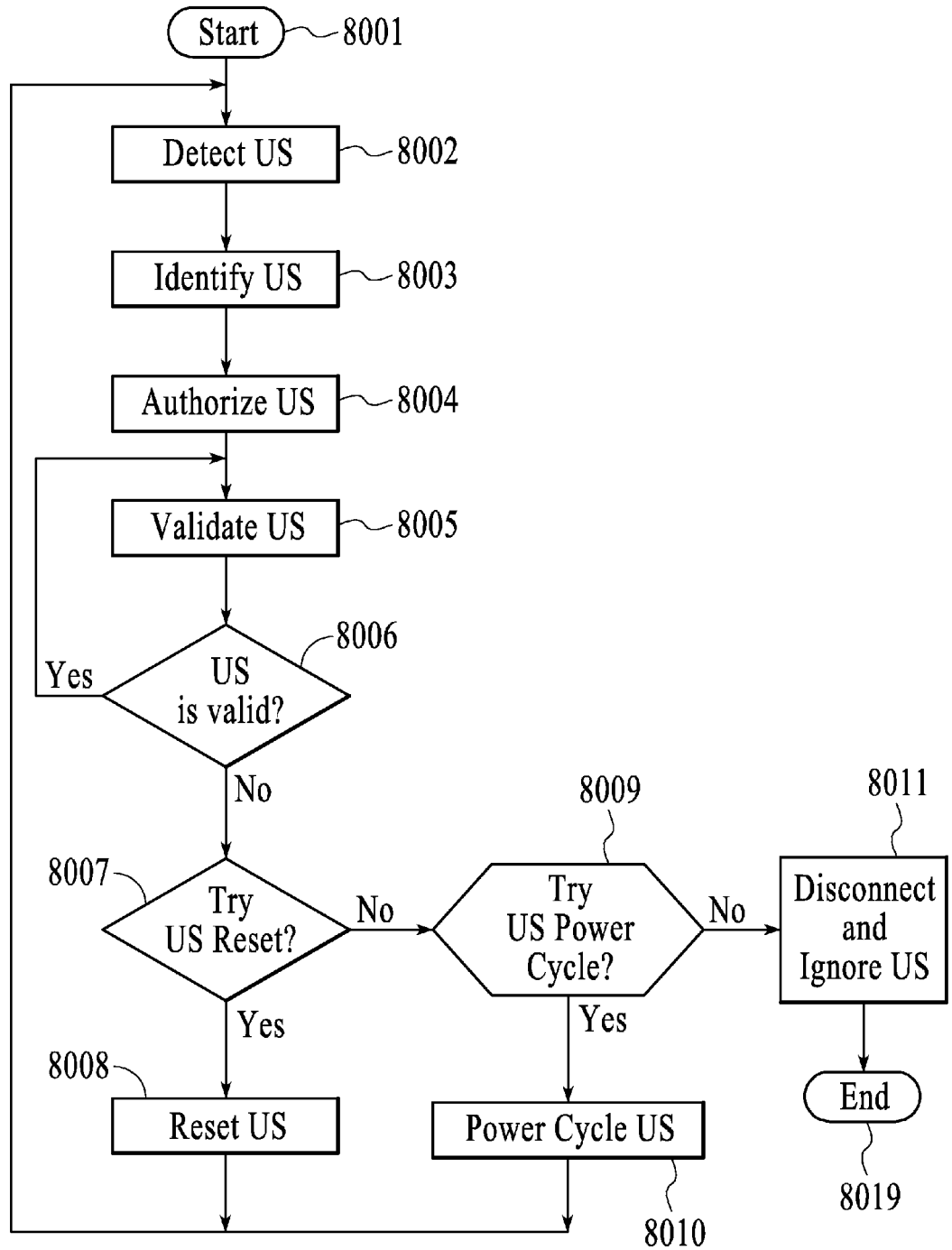
FIG. 8 is a flowchart for a Watchdog in a User System Mediator Controller.

As a result of this added redundancy the USMC can always and at any time maintain the safety and integrity of the Control System even if one, or more, system partitions in the user domain may be unsafe, may fail, and/or may be changed, upgraded, or replaced, with an advanced system partition. This is also reflected in one embodiment of this invention which is described in FIG. 8, where a Watchdog, for example Watchdog WD 7015 of FIG. 7A and FIG. 7B, executes the method of FIG. 8. For the sole sake of simplicity, this method is outlined for one single system partition. However, by running multiple instances of that Watchdog method two, or more, system partitions in the user domain can be interacted with. After the Start 8001 the Watchdog detects the existence and the connectivity of the User System in Step 8002. This can, for example, be done by querying a predetermined list of User System, or by listening to the traffic on the Communication Link to the User System, or by the User System actively requesting a connection. Once the one User System is detected it can be identified in Step 8003. Identification can, for example, be done by a unique device identifier of the User System, such as a MAC address for Ethernet, or via header information in the information, data, or signals sent from the User System. Or identification can be done by a stub running on the User System, for example stub 4009 of FIG. 4B, which sends a unique identifier to the USMC. Obviously, as explained above, the Step 8003 can be optional. After identifying the User System the Watchdog can authenticate the User System in Step 8004. Authentication can be done, for example, using the aforementioned concepts for authentication. Obviously, and as explained above, the Step 8004 can be optional.

Next, in Step 8005 the Watchdog validates the User System. Validation, again, can be done using the various aforementioned concepts including the heartbeat, keep-alive, and/or health monitoring concepts described above. Obviously, this Step 8005 can be performed once, or more than once, or from time to time, or on a regular basis. The, once or repeatedly, executed Decision 8006 decides whether the User System is valid. If the User System is valid that validation Step 8005 may be performed again, and again, and the User System may interact as specified with the USMC and, thereby, with the Control System.

However, if the User System is not valid the Watchdog goes into a so-called failure handling mode. In failure handling mode the USMC can go through certain steps to either remedy the situation, or to escalate, to ensure a proper, safe, integer operation of the overall Embedded System, in accordance to its specifications.

In a first failure handling step the Watchdog makes the Decision 8007 whether to reset the User System. If the Watchdog decides that the User System shall be reset, for example based on current or past information, data, or signals, the Watchdog enters Step 8008 and does perform a resetting of the User System. Various possibilities exist for resetting a User System, for example by pulling a hardware reset line to Ground, or by re-starting a software program from start. After Step 8008 the Watchdog must go back to Step 8002 again to re-detect the User System. If the Watchdog decides against resetting the User System, the Watchdog may decide via Decision 8009 whether, or not, to power-cycle the User System. Similar to Decision 8007, this may be based on past or current information, data, or signals. If the Watchdog decides to power-cycle the User System, in a subsequent step 8010 the User System is power-cycled. Various possibilities exist to power-cycle the User System, for example the Watchdog can issue a power-cycle request to the USPAPI which then disconnects the User System from its power-supply for a short moment. Or, the Watchdog sends a power-cycle command to a power-supply in the User System. Once the User System is power-cycled in Step 9010 the Watchdog goes back to Step 8002 to re-detect the User System.

If the Watchdog decides not to power-cycle the User System it goes to Step 8011. In this Step 8011 the Watchdog may directly, or indirectly via the USPAPI, disconnect or ignore the User System. Disconnecting can, for example, be done by electrically disconnecting the User System. Ignoring can, for example, be done by adding a Filter to the USPAPI which filters out all information, data, or signals from that once User System. Ignoring can also be done, for example, by adding an additional rule to the Firewall not to send any more information, data, or signals to that User System. However, sometimes it may be necessary to disconnect the User System to ensure proper and safe functioning of the overall Embedded System. For example, if the User System has an overheating problem, or a short circuit, which, for example, can be detected via health monitoring, a physical disconnect may be the best solution. Various concepts to physically and/or electrically disconnect a device, a component, or a system partition from a system are known in the art that can be applied. To protect the USMC (like e.g. 4003) and the attached critical Control System (such as CS 4001 of FIG. 4A or FIG. 4B) from potential damage and/or malfunctioning caused by misbehavior of the User System (such as US 4002 of FIG. 4A or FIG. 4B) or from wrong behavior due to electromagnetic interference, some means of protection have to be foreseen in the attachment of the User System to the USMC.

Figure 9:
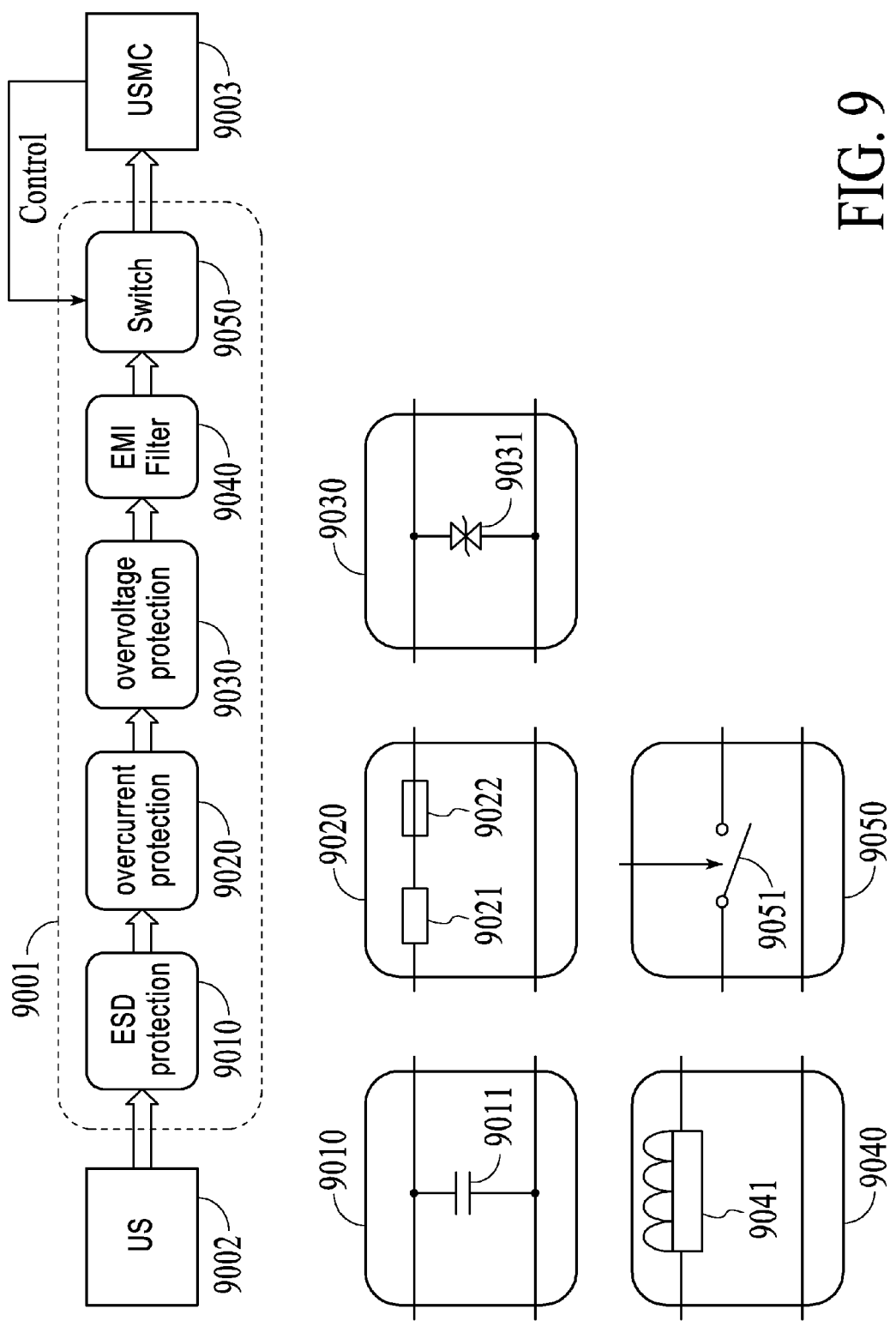
FIG. 9 shows protection chains for the User System Mediator Controller.

In one embodiment of this invention the protection means as described in FIG. 9. In FIG. 9 the User System US 9002, which can, for example, be User System US 4002, is attached via a chain of protection elements 9001 to the USMC 9003. The chain of protection elements 9001 depicted in FIG. 9 comprises different protection elements which can be combined in a multitude of different ways. In one embodiment of this invention the chain can comprise elements to protect against electrical shock (ESD) 9010, to effectively fuse over-current 9020, to protect against line conducted electromagnetic distortion 9030, and/or to electrically disconnect the User System from the USMC controlled by the USMC with stage 9040.

A chain of protection elements can be built up completely from such protection elements or from only parts of such elements. This depends on the concrete requirements and the environmental conditions the USMC operates in. Different embodiments and topologies for the connectivity between the User System and the USMC are possible.

The elements depicted in FIG. 9 are exemplarily sketched in protection elements 9010, 9020, 9030, 9040 and 9050. The given protection elements are shown for a single system partition connectivity only and, obviously, can be extended for connecting to two, or more, User System. The given protection elements are for common mode distortion only, as in single line connections differential mode distortion may not happen. Obviously, differential mode protection has to be added when multi line protection is needed.

The protection elements shall be selected in a way that it does not adversely interfere with data communication. So for each and every different embodiment of connection, proper protection elements have to be selected according to good engineering practice.

Protection element 9010 shows one typical embodiment of ESD protection comprised only of a simple capacitor 9011 to lower the voltage of the external ESD event. Other embodiments of ESD protection are well known in the art and may be used as well.

Protection element 9020 shows one typical embodiment of overcurrent limitation respectively overcurrent fuse. Overcurrent limitation is realized using a resistor 9021 and overcurrent fuse is realized using a cut-out fuse 9022.

Protection element 9030 shows one typical embodiment of overvoltage protection. Instead of the shown voltage limitation diode 9031, other elements can be used as well. These can be, for example Varistors, gas filled dischargers, spark gaps, Zener diodes. With overvoltage protection it is especially necessary to incorporate means of protection for common mode and for differential overvoltage events in multi line connections.

Protection element 9040 shows one typical embodiment of an EMI filter stage to filter out line conducted electromagnetic distortion. In the example shown, a ferrite bead 9041 is used to filter out higher frequency distortions. Other elements can be used. These can be, but are not limited to e.g. coils, suction circuits, current compensated coils, oscillation circuitry. With EMI filtering it is especially necessary to incorporate means of protection for common mode and for differential EM distortion events in multi line connections.

Protection element 9050 shows one typical embodiment of a switch 9051 controlled by the USMC. Various devices can be used to deliver the switching functionality. These can, for example, be relays, analog switches using bipolar transistors, analog switches using FETs, optocouplers to also provide galvanic isolation. Special attention has to be laid on the monitoring functions of the USMC 9003 to evaluate the conditions when hazardous events make a cut of the US 9002 necessary.

To prevent damage from a critical circuit in the User System a multi-stage protection concept can be foreseen, for example, the potential damage that can happen to the critical circuit from the outside include but are not limited to electrostatic discharge, overvoltages, overcurrent, electrical or magnetic interference. Depending on the chosen environment and the safety requirements, a multi stage protection circuit design can be foreseen to prevent these conditions from being hazardous to the critical circuit in the User System.

Figure 10A:
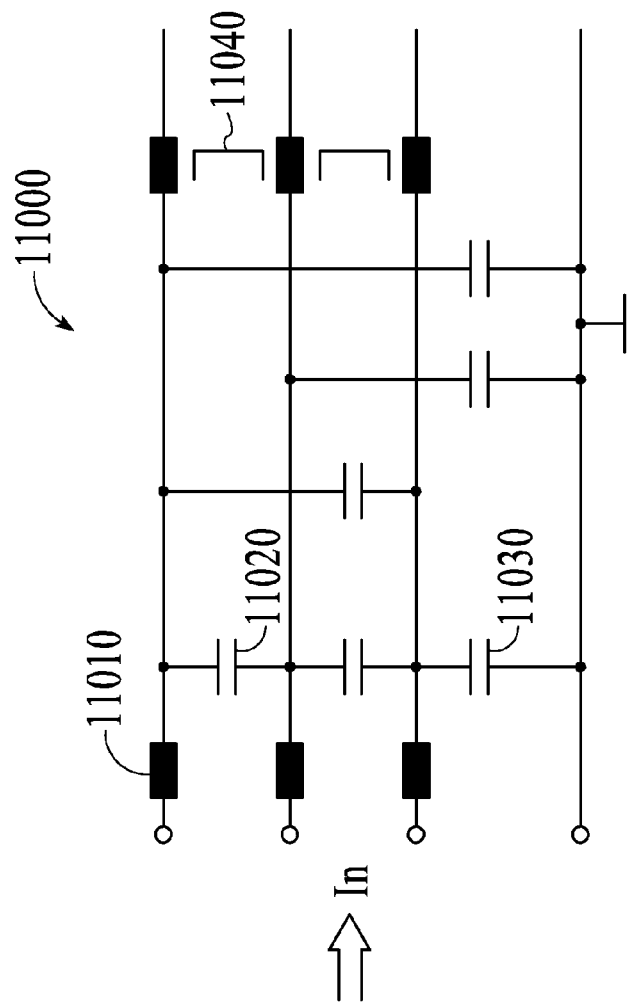
FIG. 10A, FIG. 10B and FIG. 10C show typical protection element circuits.
Figure 10A:
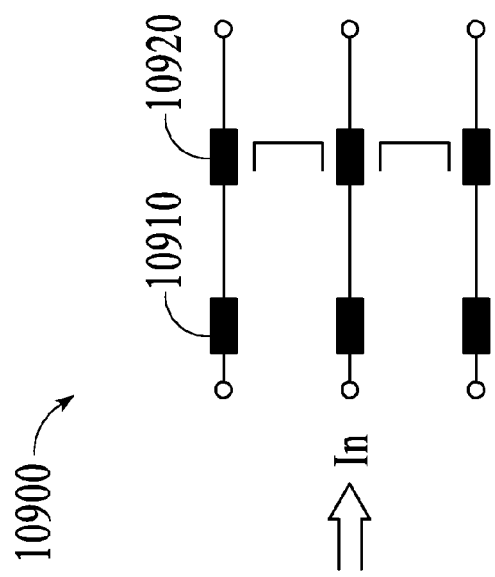
Figure 10B:
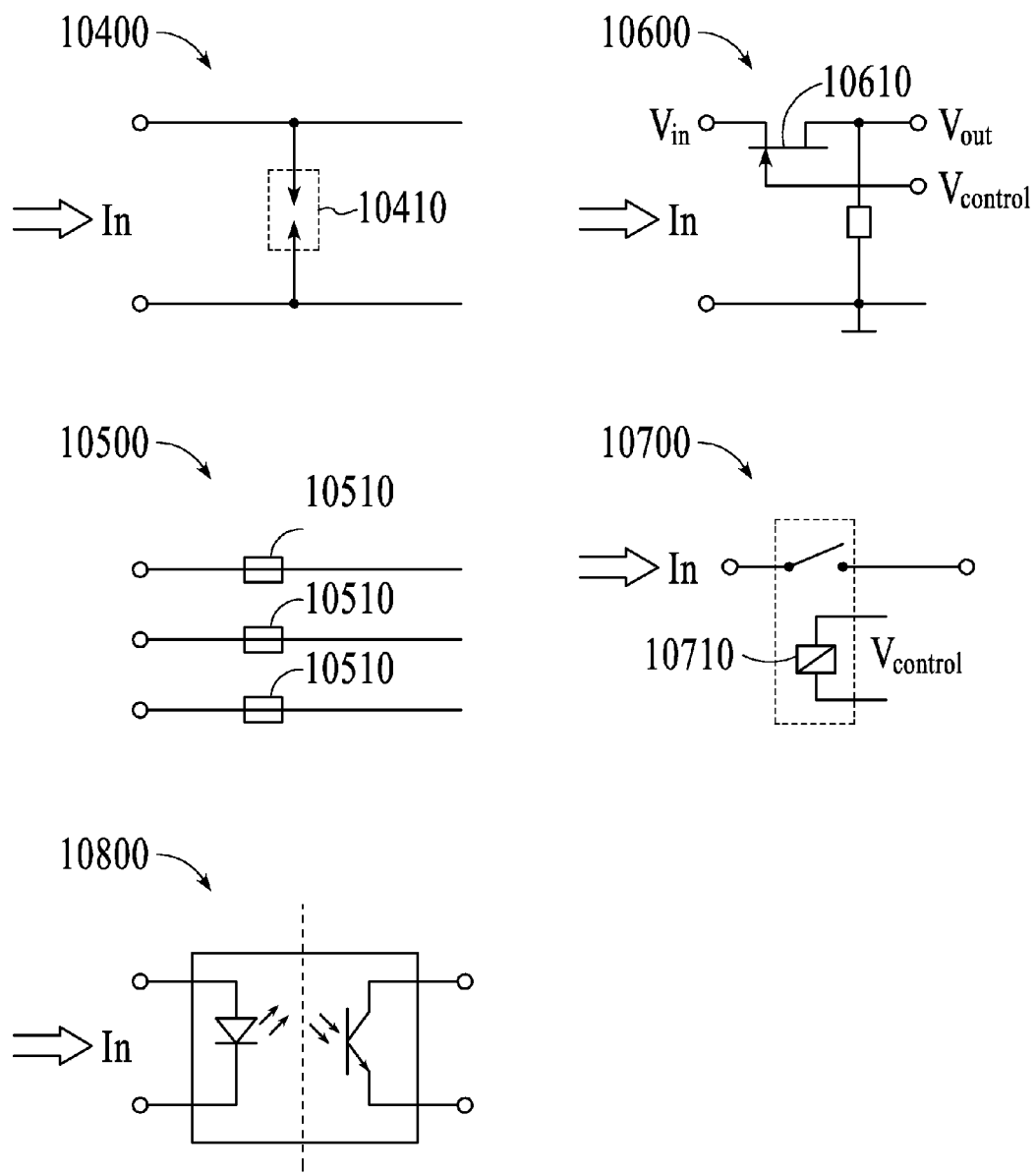
Figure 10C:
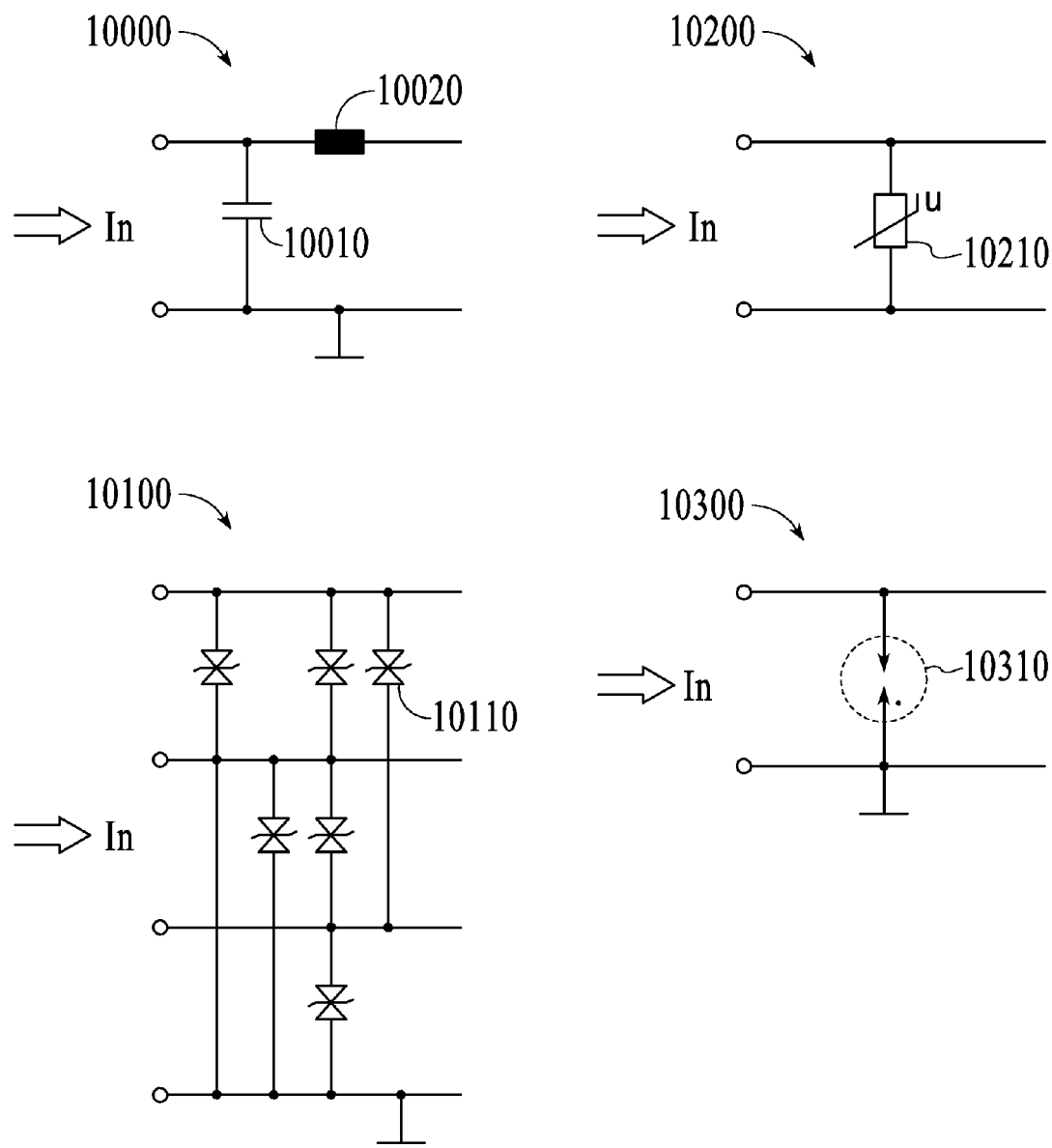

There are several possibilities for protection element circuits available, as they are shown in FIG. 10A, FIG. 10B and FIG. 10C: protection element circuit 10000 shows a typical implementation for ESD protection and line current limiter, protection element circuit 10100 shows a typical implementation for overvoltage protection using diodes, protection element circuit 10200 shows a typical implementation for overvoltage protection using varistor elements, protection element circuit 10300 shows a typical implementation for overvoltage protection using gas filled dischargers, protection element circuit 10400 shows a typical implementation for overvoltage protection using spark gap, protection element circuit 10500 shows a typical implementation for overcurrent fuse, protection element circuit 10600 shows a typical implementation for detachable connection using analog switches, protection element circuit 10700 shows a typical implementation for detachable connection using relays, protection element circuit 10800 shows a typical implementation for galvanic isolation using optocoupler, protection element circuit 10900 shows a typical implementation for EMI filters using ferrites, protection element circuit 11000 shows a typical implementation for EMI filters using coil and capacitor networks.

Obviously, chain of protection elements shall to be selected in accordance to the physical interface and the possible threats to the critical system in the Control System. Protection elements can be selected within a wide range from simple protection means up to very complex combinations of the mentioned means and other non mentioned means. The principle of operation ranges from limiting the excess voltage/current/field while maintaining full operation, over transient cut-down of excess voltage/current/field up to complete disconnection of the external device (reversible or non-reversible). The aforementioned techniques enable an Embedded System to be partitioned into a Control System and a User System, and via the User System Mediator Controller USMC, both domains can interact with each other safely, and reliably. And, via the versatility of the USMC it is possible to have sufficient flexibility when it comes to connecting different, may be even advanced User System. However, state-of-the-art microcontrollers and ASSP provide only limited flexibility in terms of information, data, or signals processing and connectivity. The spirit of this invention requires even more versatility and flexibility. This can be achieved by using a Configurable System when implementing the USMC.

A Configurable System is a data processing and compute system where certain functionality in the data processing, or in the computation, or in the input/output connectivity, or in the Communication Link can be altered, changed, upgraded, or replaced during the life-cycle. This is possible because in a Configurable System not only the SW and the FW can be altered, changed, upgraded, or replaced, but also, to a wide extent, the underlying integrated circuitry, the so-called Configurable System Integrated Circuitry, CSIC. Altering, changing, upgrading, replacing the underlying CSIC is done by a combination of two techniques: Programmable digital, or analog, circuitry and a processing environment that controls how, and when, to program, or configure, the digital, or analog, circuitry. The CSIC, again, has at least two types of programmable, or configurable, fabric out of the following: A Manufacturing-Time Fabric, MTF, which gets configured during the manufacturing step of the CSIC; a Compile-Time Fabric, CTF, which gets configured during the compile time of the CSIC; and third, a Run-Time Fabric which gets configured during the run-time of the CSIC. Manufacturing a CSIC is the step in semiconductor fabrication where integrated transistors and integrated wires are built (typically by etching silicon) in the semiconductor fabrication process. Once manufactured, the functionality of this CSIC fabric cannot be altered, an aspect which is well known from ASIC.

Compiling a CSIC is a step which involves taking an HDL description and processing that HDL description through Electronic Design Automation (EDA) tools including synthesis, place and route. A typical example of compiling a CSIC is the EDA tool ISE Design Suite from Xilinx, Inc. in San Jose, Calif. ISE Design Suite is described in the ISE 13.4 Design Suite User Guide, available for download at http://www.xilinx.com/support/documentation/dt_ise.htm, which is hereby included by reference. The result of such compile-time step is a so-called Configuration File (also known as bitfile) which can be uploaded into programmable logic, for example, to implement the desired digital, or analog, functionality. Because the Compile-Time step can be done repeatedly, by changing the HDL description, for example, and by a subsequent re-compile step, a different Configuration File can be obtained, with possibly different digital, or analog, functionality. By uploading that different Configuration File into the Compile-Time Fabric the functionality of the CSIC can thereby be altered, changed, upgraded, or replaced.

However, the uploading of a Configuration File into Compile-Time Fabric typically involves a powercycle and a restart of the CSIC, and, therefore, any system that runs on top of that typically needs to be restarted, too. Sometimes, an Embedded System must be running without any interruptions, and thus a restart is not feasible.

Run-Time is the phase where a data processing, or compute system is actively operating. Run-Time Fabric is programmable, or configurable, fabric where one, or more, predetermined Configuration Files are generated in a Compile-Time step, as it is described above, and where certain portions of the CSIC can be reconfigured by uploading the one, or more, Configuration Files without affecting other areas of the running integrated circuitry. In one embodiment of this invention this run-time configurability is achieved by Dynamic Partial Reconfiguration of FPGA.

Figure 11:
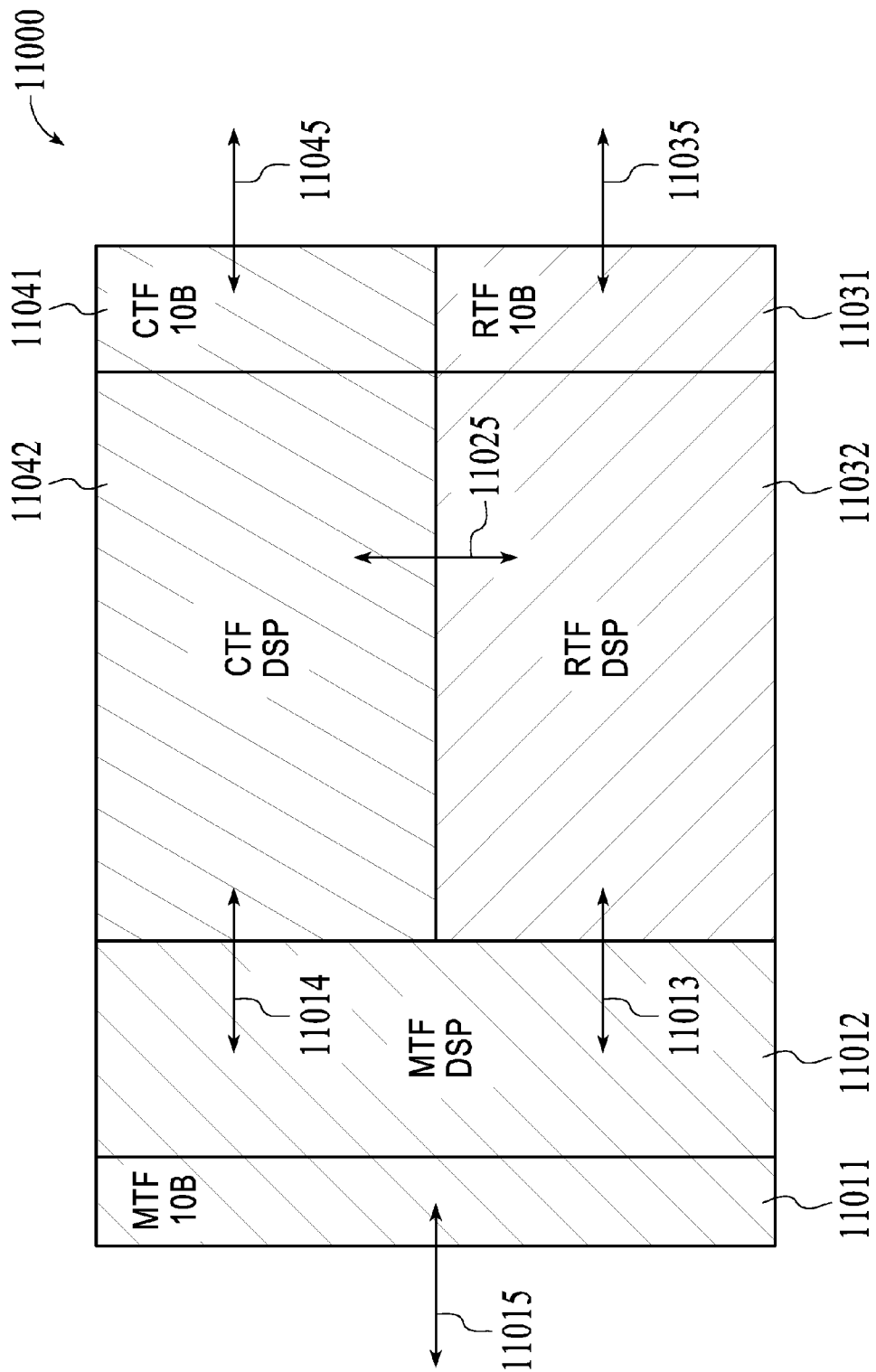
FIG. 11 shows configurable system integrated circuitry.

In one embodiment of this invention the CSIC is the CSIC 11000 of FIG. 11 which has MTF, CTF, and RTF. CSIC 11000 comprises the MTF for data and signal processing, MTF DSP 11012, as well as input/output MTF connectivity, MTF IOB 11011, for flexible connectivity and versatile Communication Link, 11015. CSIC 11000 also comprises the CTF for data and signal processing, CTF DSP 11042, as well as input/output CTF connectivity, CTF IOB 11041, for flexible connectivity and versatile Communication Link, 11045. CSIC 11000 further comprises the RTF for data and signal processing, RTF DSP 11032, as well as input/output RTF connectivity, RTF IOB 11031, for flexible connectivity and versatile Communication Link, 11035.

By combining the programmability, or configurability, of the data and signal processing and the input/output connectivity, many different Communication Link can be implemented. As a result the Communication Link 11015, or the Communication Link 11035, or the Communication Link 11045, can be one, or more, out of GSM, UMTS, LTE, GPS, CAN, MOST, Flexray, LIN, AFDX, SPI, IIC, GPIO, Ethernet, EtherCat, ProfiNET, Sercos, TTCAN, CANOpen, UDP, TCP/IP, IPSec, RS232, RS485, USB, PATA, SATA, PCIe, WiFi, Bluetooth, or any current or future Communication Link that can be implemented with digital, or analog, circuitry. Using so-called Delta-Sigma modulation certain analog inputs and/or analog outputs can be provided for Communication Link 11015, or Communication Link 11035, or Communication Link 11045, even when the underlying circuitry is entirely digital. Thus, for example, an interface within a mediator controller, for example an interface within USMC 4003 of FIG. 4A or FIG. 4B or USMC 5003 of FIG. 5A, FIG. 5B, FIG. 5C, FIG. 5D, FIG. 5E and FIG. 5F or USMC 6003 of FIG. 6, is reconfigurable so as to accommodate changes made to and within an associated second system partition such as US 4002 shown in FIG. 4A, US 5002 shown in FIG. 5B or US 6002 shown in FIG. 6.

Similarly, the data and signal processing can implement a variety of digital computation and data processing. For example, MTF DSP 11012, or CTF DSP 11042, or RTF DSP 11032, can be one, or more, of the following: A FSM, a CPU, a DSP, an ASSP, or any other combinatorial or sequential digital circuitry.

For each fabric to interact and to exchange information, data, or signals with each other there can be dedicated, bidirectional, inter-fabric connectivity such as MTF-to-RTF connect 11013, or MTF-to-CTF connect 11014, or CTF-to-RTF connect 11025.

In one embodiment of this invention the CSIC is implemented by multiple devices, connected to each other, and to their respective Communication Link via a PCB.

In another embodiment of this invention the CSIC is implemented by one single integrated semiconductor device, with the one, or more, Communication Link connected via a PCB.

In yet another embodiment of this invention the CSIC is a single FPGA device, for example a device from the Virtex device family from Xilinx, Inc. in San Jose, Calif., or the Stratix device family from Altera Corp. in San Jose, Calif.

A special processing environment controls how, and when, the RTF can be programmed, or configured, during run-time. As such the processing environment shall be implemented either in MTF or in CTF.

Figure 12:
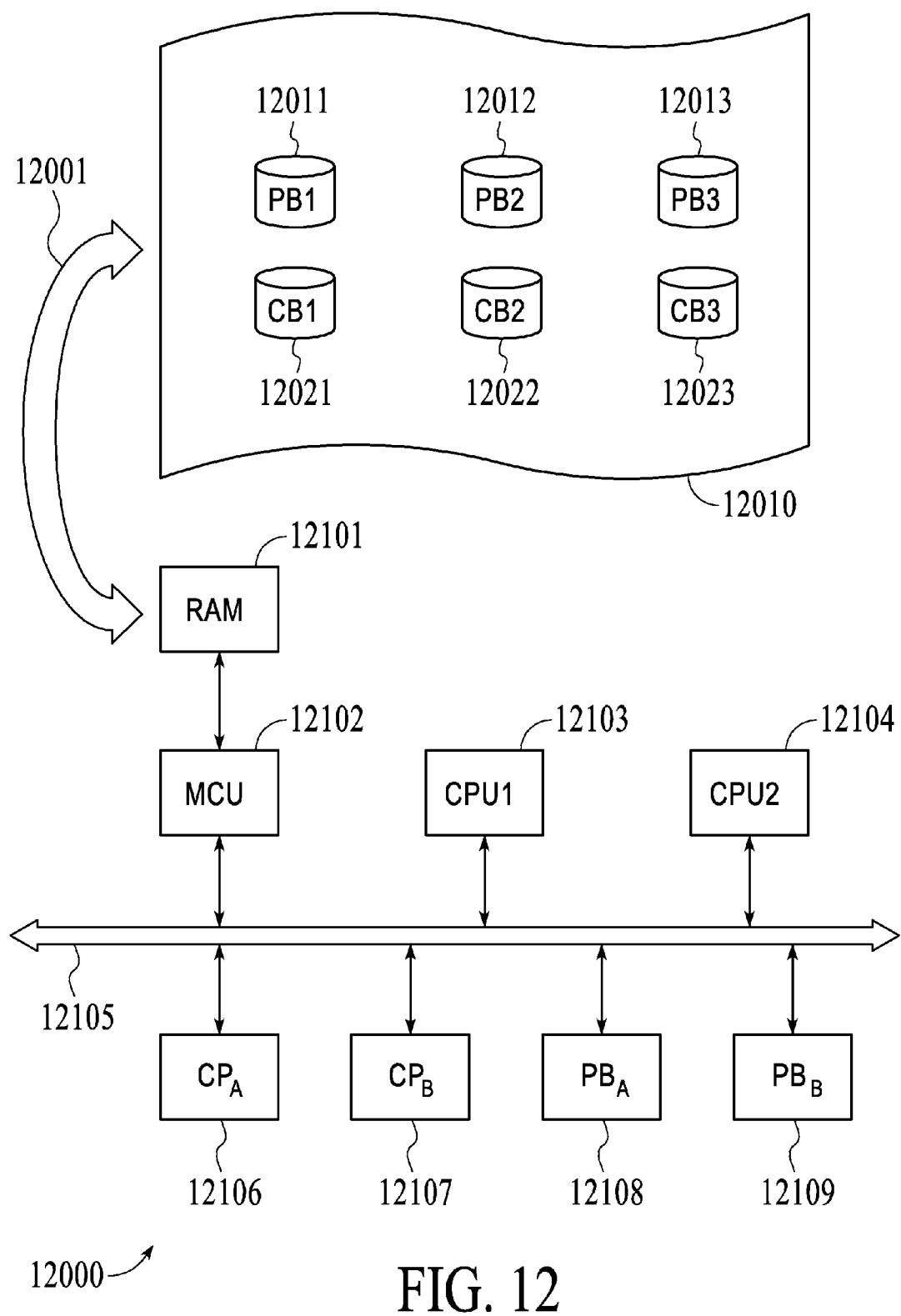
FIG. 12 shows a processing environment for run-time configurable fabric.

In one embodiment of this invention this processing environment is the Processing Environment 12000 of FIG. 12. Via connectivity means 12105 multiple data processing and compute blocks are connected to each other, to interact and to exchange information, data, or signals. Various concepts are known in the art for such connectivity means, for example an on-chip bus architecture like the PLB, or a network-on-chip architecture like AXI, or any other digital, or analog, connectivity.

The basic Processing Environment 12000 has at least one CPU, CPU1 12103, at least one MCU, MCU 12102, and at least one RAM, RAM 12101, connected to each other by connectivity means 12105. Obviously, the Processing Environment can have more than one CPU, for example it can have a second CPU, CPU2 12104, to implement symmetric multi-processing, or asymmetric multiprocessing compute architectures.

The one, or more, CPU of the Processing Environment execute Software, for example SW 12010. This SW 12010 comprises, among other Software, and/or Firmware, and/or OS code, one, or more, Configuration Files for co-processing, and/or one, or more, Configuration Files for peripherals. For example, SW 12010 comprises Configuration Files CB1 12021, CB2 12022, CB3 12023 for co-processing, and PB1 12011, PB2 12012, PB3 12013 for peripherals. SW 12010 can be executed on the one, or more CPU, once, or from time to time, or repeatedly, or on a regular basis. Then one, or more, out of CB1 12021, or CB2 12022, or CB3 12023, or PB1 12011, or PB2 12012, or PB3 12013, can be uploaded into dedicated programmable, or configurable, blocks, such as, for example co-processing block CBA 12106, or CBB 12107, or peripheral block PBA 12108, or PBB 12109, respectively. Obviously these co-processing blocks and these peripheral blocks reside in the RTF.

As a result, a CSIC can be implemented that has significant flexibility and versatility to alter, change, upgrade, or replace data processing and compute functionality as well as input/output connectivity and Communication Link over the life-cycle, either once, at manufacturing time, or many times during compile time, or if required by the application even at run-time.

And it is the ability to alter, change, upgrade, or replace functionality during the compile-time and the run-time that allows to implement User System Mediator Controller, such as USMC 4003 of FIG. 4A or FIG. 4B, for example, that finally allows to de-couple the life-cycle of an Embedded System from the Target System.

This can be used to build certain advantageous Embedded System by utilizing innovative, cost effective consumer electronics and, yet, avoid the lengthy and costly procedures and processes of safety and integrity system design.

For example, this can be used to build a more light-weight and power-efficient and less heat dissipating IFEC. Or, it can be used to build a more cost-efficient IVI with rich multimedia. Or, it can be used to build a more ergonomic MMI for robotics and medical systems.

We claim:

1. A partitioned system, comprising:
    a first system partition, the first system partition including an electronic control system that controls operation of a target system, the first system partition designed to operate in compliance with a predetermined safety integrity level, the predetermined safety integrity level including a level of functional safety that is free from unacceptable risk of physical injury or of damage to health of people either directly or indirectly;
    a second system partition that includes hardware that is separate from hardware used within the first system partition, the second system partition operating in a user domain not designed to operate in compliance with the predetermined safety integrity level where information supplied by the second system partition is not sufficiently reliable to be used by the first system partition while operating in compliance with the predetermined safety integrity level; and,
    a programmable circuit that includes dedicated hardware that is separate from hardware used within the second system partition, the programmable circuit being connected between the first system partition and the second system partition, the programmable circuit receiving the information supplied by the second system partition, the programmable circuit monitoring and supervising the second system partition in order to maintain compliance of the first system partition with the predetermined safety integrity level including the level of functional safety that is free from unacceptable risk of physical injury or of damage to health of people either directly or indirectly;
    wherein the programmable circuit comprises configurable system integrated circuitry that includes manufacturing-time fabric that is configured during manufacturing of the configurable system integrated circuitry, compile-time fabric that is configured during compile time for the configurable system integrated circuitry and run-time fabric that is configured during run-time for the configurable system integrated circuitry; and
    wherein during compile time, hardware description language is taken through electronic design automation tools including synthesis, place and route to produce a first configuration file that is uploaded into the compile-time fabric and to additionally produce a second configuration file that is uploaded into the run-time fabric during run-time of the partitioned system without affecting operating integrity of the first system partition.

2. A partitioned system as in claim 1 wherein the programmable circuit is designed to operate in compliance with the predetermined safety integrity level.

3. A partitioned system as in claim 1 wherein the programmable circuit has an interface to the second system partition, the interface being reconfigurable so as to accommodate changes made to and within the second system partition.

4. A partitioned system as in claim 1 wherein the programmable circuit acts as a proxy to provide to the second system partition services information, data or signals from the first system partition.

5. A partitioned system as in claim 1 wherein the programmable circuit acts as a proxy to provide to the first system partition services information, data or signals from the second system partition.

6. A partitioned system as in claim 1 wherein the first system partition is one of a plurality of system partitions within the safety integrity level, the programmable circuit being connected to each of the plurality of system partitions within the safety integrity level, the programmable circuit monitoring and supervising use of the information by the plurality of system partitions within the safety integrity level in order maintain requirements of the safety integrity level to protect the system or operators of the system from harm.

7. A partitioned system as in claim 1 wherein the second system partition is one of a plurality of system partitions within the user domain, the programmable circuit being connected to each of the plurality of system partitions within the user domain, the programmable circuit monitoring and supervising use of any information supplied by the plurality of system partitions in order maintain requirements of the safety integrity level to protect the system or operators of the system from harm.

8. A partitioned system as in claim 1 additionally comprising:
    a protection device connected between the programmable circuit and the second system partition, the protection device including a switch that disconnects the second system from the programmable circuit based on input from at least one of the following protection elements:
        an electrostatic discharge protection element;
        an overcurrent protection element;
        an overvoltage protection element;
        an electromagnetic interference filter element.

9. A partitioned system as in claim 1, wherein the compile-time fabric and the run-time fabric are used for data signal processing.

10. A partitioned system as in claim 1, wherein the compile-time fabric and the run-time fabric are used for input/output buffering and wherein the second configuration file changes during run-time at least one of the following:
    voltage levels for input/output buffering;
    signaling standards;
    a communication protocol.

11. A method for implementing a partitioned system, the method comprising:
    operating a first system partition, the first system partition designed to operate in compliance with a predetermined safety integrity level, the predetermined safety integrity level including a level of functional safety that is free from unacceptable risk of physical injury or of damage to health of people either directly or indirectly, the first system partition including an electronic control system that controls operation of a target system;
    operating a second system partition within a user domain not designed to operate in compliance with the predetermined safety integrity in which information supplied by the second system partition is not sufficiently reliable to be used by the first system partition, the second system partition including hardware that is separate from hardware used within the first system partition;

receiving the information from the second system partition by a programmable circuit connected between the first system partition and the second system partition, the programmable circuit monitoring and supervising use of the information in order to maintain compliance of the first system partition with the predetermined safety integrity level, wherein the programmable circuit includes dedicated hardware that is separate from hardware used within the second system partition; and, monitoring and supervising the second system partition by the programmable circuit in order to maintain compliance of the first system partition with the predetermined safety integrity level including the level of functional safety that is free from unacceptable risk of physical injury or of damage to health of people either directly or indirectly wherein the programmable circuit comprises configurable system integrated circuitry that includes manufacturing-time fabric that is configured during manufacturing of the configurable system integrated circuitry, compile-time fabric that is configured during compile time for the configurable system integrated circuitry and run-time fabric that is configured during run-time for the configurable system integrated circuitry; and wherein during compile time, hardware description language is taken through electronic design automation tools including synthesis, place and route to produce a first configuration file that is uploaded into the compile-time fabric and to additionally produce a second configuration file that is uploaded into the run-time fabric during run-time of the partitioned system without affecting operating integrity of the first system partition.

12. A method as in claim 11 additionally comprising:
reconfiguring an interface of the programmable circuit to the second system partition so as to accommodate changes made to and within the second system partition.

13. A method as in claim 11 wherein the monitoring and supervising includes acting as a proxy to provide to the second system partition services information, data or signals from the first system partition.

14. A method as in claim 11 wherein the monitoring and supervising includes acting as a proxy to provide to the first system partition services information, data or signals from the second system partition.

15. A method as in claim 11, wherein the compile-time fabric and the run-time fabric are used for data signal processing.

16. A method as in claim 11, wherein the compile-time fabric and the run-time fabric are used for input/output buffering and wherein the second configuration file changes during run-time at least one of the following:
voltage levels for input/output buffering;
signaling standards;
a communication protocol.

17. An interface comprising:
a programmable circuit for connection between a first system and a second system;

wherein the first system includes an electronic control system that controls operation of a target system, the first system designed to operate in compliance with a predetermined safety integrity level, the predetermined safety integrity level including a level of functional safety that is free from unacceptable risk of physical injury or of damage to health of people either directly or indirectly;

wherein the second system operates in a user domain not designed to operate in compliance with the predetermined safety integrity in which information supplied by the second system is not sufficiently reliable to be used by the first system operating in compliance with the predetermined safety integrity level, the second system including hardware that is separate from hardware used within the first system;

wherein the programmable circuit is configured to receive the information supplied by the second system;

wherein the programmable circuit includes dedicated hardware that is separate from hardware used within the second system;

wherein the programmable circuit comprises configurable system integrated circuitry that includes manufacturing-time fabric that is configured during manufacturing of the configurable system integrated circuitry, compile-time fabric that is configured during compile time for the configurable system integrated circuitry and run-time fabric that is configured during run-time for the configurable system integrated circuitry; and wherein during compile time, hardware description language is taken through electronic design automation tools including synthesis, place and route to produce a first configuration file that is uploaded into the compile-time fabric and to additionally produce a second configuration file that is uploaded into the run-time fabric during run-time of the interface.

18. A device as in claim 17 wherein the device is an automotive system and the safety domain operates in accordance with European Functional Safety standards based on the International Electrotechnical Commission's (IEC) 61508 standard.

19. A device as in claim 17 wherein the programmable circuit controls a switch that disconnects the second system from the programmable circuit based on input from at least one of the following protection elements:
an electrostatic discharge protection element;
an overcurrent protection element;
an overvoltage protection element;
an electromagnetic interference filter element.

20. A device as in claim 17, wherein the compile-time fabric and the run-time fabric are used for data signal processing and for input/output buffering and wherein the second configuration file changes during run-time at least one of the following:
voltage levels for input/output buffering;
signaling standards;
a communication protocol.

* * * * *